United States Patent
Pennecot et al.

(10) Patent No.: US 9,063,549 B1
(45) Date of Patent: Jun. 23, 2015

(54) LIGHT DETECTION AND RANGING DEVICE WITH OSCILLATING MIRROR DRIVEN BY MAGNETICALLY INTERACTIVE COIL

(71) Applicant: Google Inc., Mountain View, CA (US)

(72) Inventors: Gaetan Pennecot, San Francisco, CA (US); Pierre-yves Droz, Mountain View, CA (US); Zachary Morriss, San Francisco, CA (US); William McCann, San Francisco, CA (US)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 13/787,107

(22) Filed: Mar. 6, 2013

(51) Int. Cl.
| | |
|---|---|
| G05D 1/00 | (2006.01) |
| G05D 1/02 | (2006.01) |
| G02B 26/10 | (2006.01) |
| G01S 17/02 | (2006.01) |
| G01S 17/93 | (2006.01) |

(52) U.S. Cl.
CPC ............ G05D 1/0231 (2013.01); G05D 1/0259 (2013.01); G02B 26/105 (2013.01); G05D 1/0257 (2013.01); G01S 17/026 (2013.01); G01S 17/93 (2013.01)

(58) Field of Classification Search
CPC ....... G01S 17/026; G01S 17/93; G01S 7/481; G01S 7/4817; G01D 1/0257; G01D 1/0231; G01D 1/0236; G01D 1/024; G01D 1/0242; G02B 26/105; G02B 26/0816; G02B 26/085
USPC ................................................ 701/300, 301
See application file for complete search history.

(56) References Cited

U.S. PATENT DOCUMENTS

| | | | |
|---|---|---|---|
| 3,790,277 A | 2/1974 | Hogan | |
| 4,700,301 A | 10/1987 | Dyke | |
| 4,709,195 A | 11/1987 | Hellekson et al. | |
| 5,202,742 A * | 4/1993 | Frank et al. ..................... | 356/5.1 |
| 7,089,114 B1 * | 8/2006 | Huang .......................... | 701/301 |
| 7,248,342 B1 | 7/2007 | Degnan | |
| 7,255,275 B2 | 8/2007 | Gurevich et al. | |
| 7,969,558 B2 * | 6/2011 | Hall ............................. | 356/5.01 |

(Continued)

FOREIGN PATENT DOCUMENTS

JP    55007707 A    7/1978

OTHER PUBLICATIONS

Gogue, George and Stupak, Joseph, Voice-Coil Actuators: Insight into the Design, PCIM 1989 conference, Long Beach, CA, Oct. 1989 (16 pages).

(Continued)

Primary Examiner — John Q Nguyen
Assistant Examiner — Michael Whalen
(74) Attorney, Agent, or Firm — McDonnell Boehnen Hulbert & Berghoff LLP

(57) ABSTRACT

A light detection and ranging (LIDAR) device that scans through a scanning zone while emitting light pulses and receives reflected signals corresponding to the light pulses is disclosed. The LIDAR device scans the scanning zone by directing light toward a rotating mirror to direct the light pulses through the scanning zone. The rotating mirror is driven by a conductive coil in the presence of a magnetic field. The conductive coil is coupled to the rotating mirror and arranged in a plane perpendicular to the axis of rotation of the mirror. The axis of rotation of the mirror is oriented substantially parallel to a reflective surface of the mirror and passes between the reflective surface and the conductive coil.

20 Claims, 13 Drawing Sheets

(56) References Cited

U.S. PATENT DOCUMENTS

| | | | |
|---|---|---|---|
| 8,035,875 B2 | 10/2011 | Shigematsu et al. | |
| 8,072,663 B2 | 12/2011 | O'Neill et al. | |
| 8,836,922 B1* | 9/2014 | Pennecot et al. | 356/4.01 |
| 2009/0051997 A1* | 2/2009 | Maeno et al. | 359/214.1 |
| 2010/0073750 A1* | 3/2010 | Yamaguchi et al. | 359/200.7 |
| 2010/0078582 A1* | 4/2010 | Maeno et al. | 250/578.1 |
| 2010/0188648 A1* | 7/2010 | Maeno et al. | 356/4.01 |
| 2011/0216304 A1* | 9/2011 | Hall | 356/4.01 |
| 2011/0310451 A1 | 12/2011 | Lin | |
| 2014/0236414 A1* | 8/2014 | Droz et al. | 701/28 |
| 2015/0009485 A1* | 1/2015 | Mheen et al. | 356/4.01 |

OTHER PUBLICATIONS

Gogue, George and Stupak, Joseph, Chapter 11: Voice-Coil Actuators, Designfax, Sep. 1989 (41 pages).

* cited by examiner

LIGHT DETECTION AND RANGING DEVICE WITH OSCILLATING MIRROR DRIVEN BY MAGNETICALLY INTERACTIVE COIL

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the vehicle's directional controls to cause the vehicle to navigate around the obstacle.

One such sensor is a light detection and ranging (LIDAR) device. A LIDAR actively estimates distances to environmental features while scanning through a scene to assemble a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. A three-dimensional map of points of reflective features is generated based on the returning pulses for the entire scanning zone. The three-dimensional point map thereby indicates positions of reflective objects in the scanned scene.

SUMMARY

Some embodiments of the present disclosure relate to a light detection and ranging (LIDAR) device that scans through a scanning zone while emitting light pulses and receives reflected signals corresponding to the light pulses. The device scans the scanning zone by directing light toward a rotating mirror to direct the light pulses through the scanning zone. The rotating mirror is driven by a conductive coil in the presence of a magnetic field. The conductive coil is coupled to the rotating mirror and arranged in a plane perpendicular to the axis of rotation of the mirror. The axis of rotation of the mirror is oriented substantially parallel to a reflective surface of the mirror and passes between the reflective surface and the conductive coil.

Some embodiments of the present disclosure provide a light detection and ranging (LIDAR) device comprising a rotating mirror system, and a light source. The rotating mirror system can include: a mirror body, a conductive coil, a driving circuit, and at least one magnet. The mirror body can have a reflective side and a back side opposite the reflective side. The mirror body can be arranged such that a change in angle of rotation creates a corresponding change in orientation of a normal direction of the reflective side. The conductive coil can be coupled to the mirror body. The conductive coil can be oriented in a plane substantially perpendicular to the axis of rotation. The conductive coil can be arranged such that the axis of rotation is between the reflective side and the conductive coil. The driving circuit can be configured to create a current through the conductive coil. The at least one magnet can have an associated magnetic field arranged such that current flowing through the conductive coil urges the conductive coil in a direction perpendicular to both the magnetic field and the direction of current flow so as to generate a torque on the mirror body. The light source can be configured to emit light pulses directed toward the rotating mirror system such that the light pulses are reflected by the reflective side and emitted from the LIDAR device according to the orientation of the reflective side.

Some embodiments of the present disclosure provide an autonomous vehicle system including a light detection and ranging (LIDAR) device and a controller. The LIDAR device can include a rotating mirror system, a light source, and a sensor. The rotating mirror system can include: a mirror body, a conductive coil, a driving circuit, and at least one magnet. The mirror body can have a reflective side and a back side opposite the reflective side. The mirror body can be arranged such that a change in angle of rotation creates a corresponding change in orientation of a normal direction of the reflective side. The conductive coil can be coupled to the mirror body. The conductive coil can be oriented in a plane substantially perpendicular to the axis of rotation. The conductive coil can be arranged such that the axis of rotation is between the reflective side and the conductive coil. The driving circuit can be configured to create a current through the conductive coil. The at least one magnet can have an associated magnetic field arranged such that current flowing through the conductive coil urges the conductive coil in a direction perpendicular to both the magnetic field and the direction of current flow so as to generate a torque on the mirror body. The light source can be configured to emit light pulses directed toward the rotating mirror system such that the light pulses are reflected by the reflective side and emitted from the LIDAR device according to the orientation of the reflective side. The sensor can be configured to receive returning reflected signals corresponding to the light pulses emitted from the LIDAR device. The controller can be configured to instruct the LIDAR device to scan a scanning zone while emitting light pulses. The controller can also be configured to receive information from the LIDAR device indicative of the time delays between emission of the light pulses and reception of the corresponding returning reflected signals. The controller can also be configured to identify obstacles surrounding the autonomous vehicle based on the time delays and orientations of the LIDAR device while emitting the light pulses. The controller can also be configured to control the autonomous vehicle to avoid the identified obstacles.

Some embodiments of the present disclosure provide a method. The method can include emitting light pulses from a light source in a light detection and ranging (LIDAR) device toward a reflective side of a mirror. The method can also include applying an alternating current to a conductive coil coupled to the mirror while emitting the series of light pulses. The conductive coil can be oriented in a plane substantially perpendicular to an axis of rotation of the mirror. The axis of rotation of the mirror can be oriented substantially parallel to the reflective side of the mirror and situated between the reflective side of the mirror and the conductive coil. At least one magnet can be arranged such that current flowing through the conductive coil urges the conductive coil in a direction perpendicular to both the magnetic field and the direction of current flow so as to generate a torque on the mirror about the axis of rotation such that the applied alternating current causes the mirror to oscillate according to the amplitude and frequency of the applied alternating current. The method can also include receiving returning reflected signals corresponding to the emitted light pulses. The method can also include identifying obstacles surrounding an autonomous vehicle associated with the LIDAR device based on the received returning reflected signals and based on the orientations of the mirror in the LIDAR device while emitting the light pulses. The method can also include controlling the autonomous vehicle to avoid the identified obstacles.

Some embodiments of the present disclosure provide a light detection and ranging (LIDAR) device comprising a rotating mirror system, and a light source. The rotating mirror system can include: a mirror body, a driving circuit, at least one magnet with an associated magnetic field, and means for magnetically driving the mirror to rotate according to signals from the driving circuit. The light source can be configured to emit light pulses directed toward the rotating mirror system such that the light pulses are reflected by the reflective side and emitted from the LIDAR device according to the orientation of the reflective side.

These as well as other aspects, advantages, and alternatives, will become apparent to those of ordinary skill in the art by reading the following detailed description, with reference where appropriate to the accompanying drawings.

DETAILED DESCRIPTION

Figure 1:
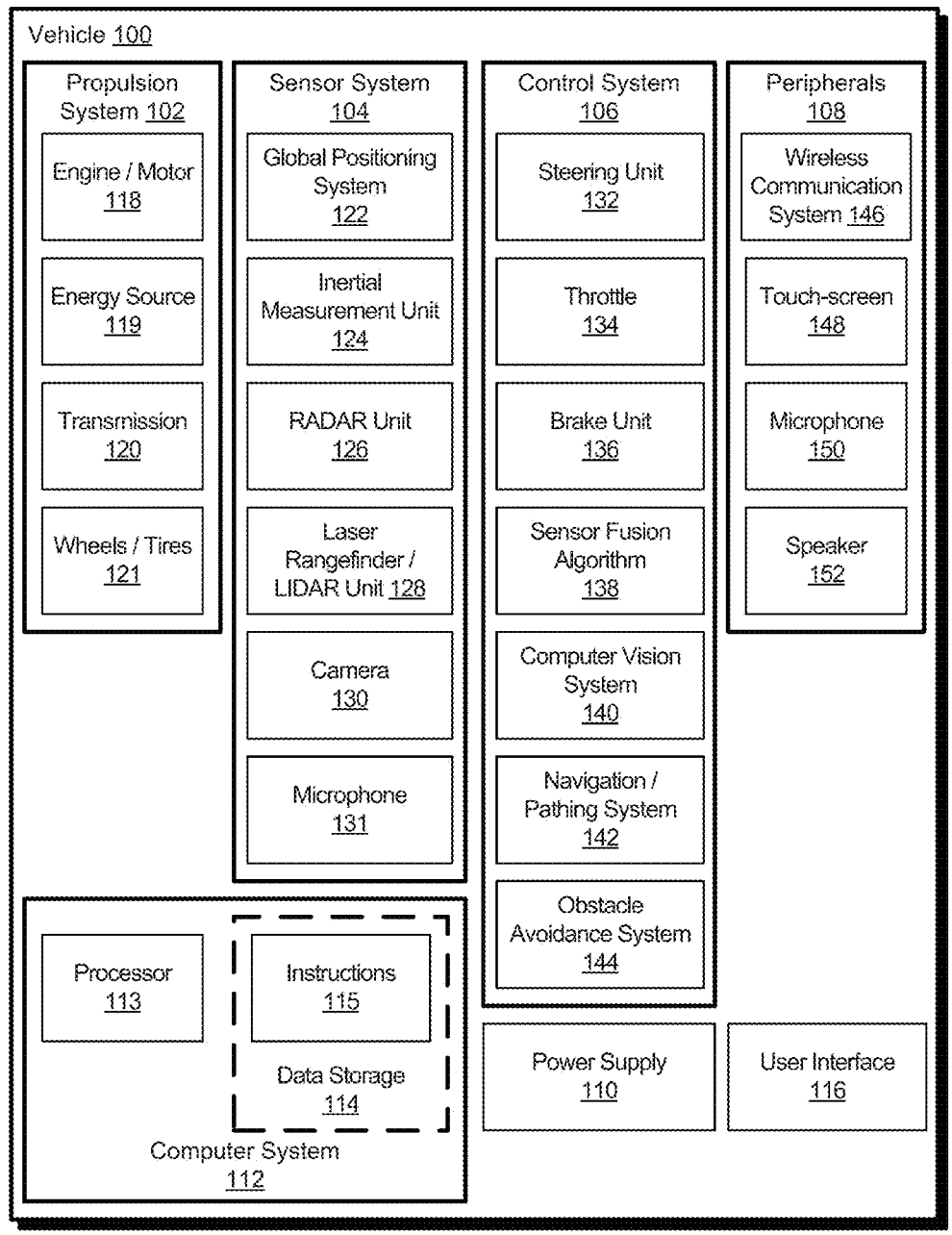
FIG. 1 is a functional block diagram depicting aspects of an example autonomous vehicle.

Example embodiments relate to an autonomous vehicle, such as a driverless automobile, that includes a light detection and ranging (LIDAR) sensor for actively detecting reflective features in the environment surrounding the vehicle. A controller analyzes information from the LIDAR sensor to identify the surroundings of the vehicle. The controller determines how to direct the propulsion systems of the vehicle to effect a navigation path that substantially avoids obstacles indicated by the information from the LIDAR sensor.

Each distance measurement of a scanning LIDAR is associated with a point or "spot" on a reflective feature in the environment surrounding the LIDAR from which an emitted pulse is reflected. Scanning the LIDAR through a range of orientations provides a three-dimensional distribution of reflective points, which is referred to herein as a 3-D point map or 3-D point cloud. Spatial features that appear in a 3-D point map generally correspond to objects detected by laser pulses from the LIDAR that bounce off the objects' surfaces as the LIDAR scans across a scanning zone.

According to some embodiments, a LIDAR device includes a rotating mirror driven by a conductive coil that generates torque on the mirror by interacting with a magnetic field. The conductive coil can be embedded in a printed circuit board attached to the back side of the rotating mirror. The printed circuit board extends outward from the mirror in a plane substantially perpendicular to the axis of rotation of the mirror. Thus, the conductive coil can be oriented in a plane substantially perpendicular to the axis of rotation of the mirror.

Magnets are arranged to generate a magnetic field that interacts with current carried by the conductive coil to apply torque on the mirror. For example, a pair of magnets can be situated on the same side of the conductive coil with one having its North polarity faced toward the coil and the other having its South polarity faced toward the coil. The two magnets can create a magnetic field with a first region in the vicinity of a first radial section of the conductive coil where the local magnetic field is oriented in a first direction parallel to the axis of rotation. The magnetic field may also have a second region in the vicinity of a second radial section of the conductive coil where the local magnetic field is oriented in a second direction antiparallel to the first direction. Thus, the magnetic field associated with the magnets can be directed in opposite directions on opposite sides of the conductive coil. The magnets may also be mounted to a ferromagnetic yoke to substantially confine the magnetic field to the region surrounding the conductive coil. The ferromagnetic yoke may, for example, complete a magnetic circuit between the two magnets.

To generate torque on the mirror to cause rotation about the axis of rotation, current is applied to the conductive coil. The current in the coil generates a Lorentz force on the loop that is everywhere perpendicular to both the orientation of the local magnetic field and the direction of the current. Due to the vector cross product between current and magnetic field in the Lorentz force, the two sides of the conductive coil extended along the radial direction contribute torque in the same direction when the local magnetic field in the vicinity of the two sides are mutually antiparallel. Moreover, the direction of the torque on the rotating mirror system depends on the current direction. Accordingly, changing the direction of current applied to the conductive coil changes the direction of torque on the rotating mirror.

Applying an oscillating current to the conductive loop causes the mirror to undergo oscillatory motion with an angular deflection amplitude and frequency that depend on the amplitude and frequency of the applied alternating current. The permanent magnets and yoke can remain fixed as the mirror rotates. In one approach, a housing may be provided for mounting the permanent magnets. The mirror may then be rotatably mounted to the housing, for example, by situating a pivot rod within a seating in the housing that allows the mirror to rotate with respect to the housing.

One or more springs can be connected to the oscillating mirror to create a resonance condition on the oscillatory motion of the mirror. For example, a pair of springs can be connected between side edges of the mirror at a point away from the axis of rotation and anchored to the housing. The pair of springs can then compress and stretch, respectively, while the mirror oscillates away from its nominal, non-rotated position. The springs may then combine to contribute torque urging the mirror to return to its nominal, non-rotated position whenever the mirror oscillates away from the nominal position, and the force from the springs can be at least roughly proportionate to the angular displacement from the nominal position. One or more torsional springs wrapped around the axis of rotation may also be used to create a resonance condition on the oscillatory motion of the mirror. The resonant frequency of the oscillatory mirror can then be tuned by adjusting the properties of the springs to create a system with a desired frequency response.

In addition, an optical encoder can be used to monitor the position of the mirror as it rotates. For example, a disk with a pattern of cut outs and/or tick marks can be fixed to the mirror and a light sensor can be fixed relative to the permanent magnets and/or housing. The light sensor can be used to count the tick marks as the mirror rotates to provide feedback on the orientation of the mirror.

In example embodiments, the example system may include one or more processors, one or more forms of memory, one or more input devices/interfaces, one or more output devices/interfaces, and machine-readable instructions that when executed by the one or more processors cause the system to carry out the various functions, tasks, capabilities, etc., described above.

Some aspects of the example methods described herein may be carried out in whole or in part by an autonomous vehicle or components thereof. However, some example methods may also be carried out in whole or in part by a system or systems that are remote from an autonomous vehicle. For instance, an example method could be carried out in part or in full by a server system, which receives information from sensors (e.g., raw sensor data and/or information derived therefrom) of an autonomous vehicle. Other examples are also possible.

Example systems within the scope of the present disclosure will now be described in greater detail. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, wireless communication system 146 can communicate with a wireless local area network (WLAN), for example, using WiFi. In some embodiments, wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
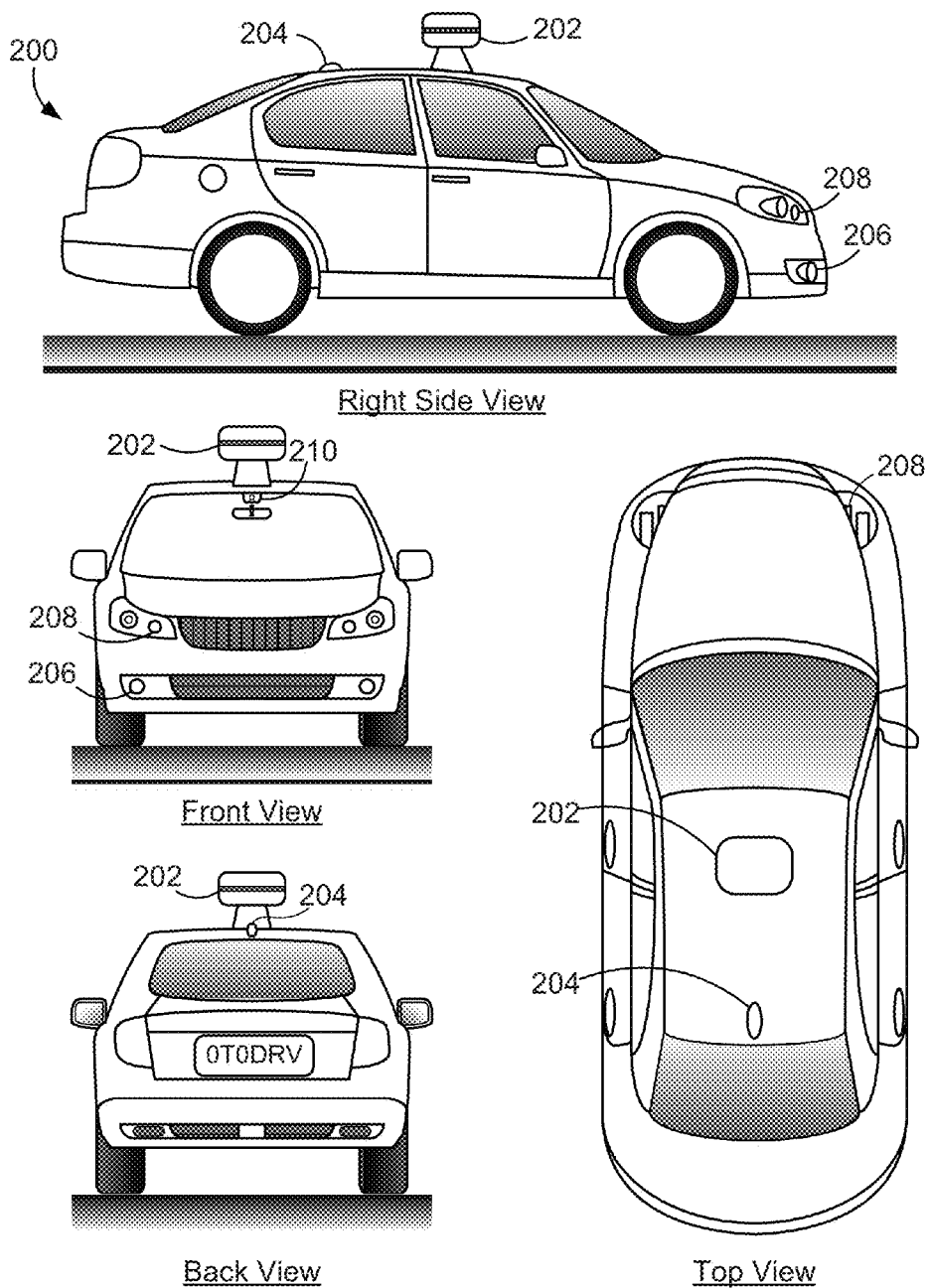
FIG. 2 depicts exterior views of an example autonomous vehicle.

FIG. 2 shows an example vehicle 200 that can include some or all of the functions described in connection with vehicle 100 in reference to FIG. 1. Although vehicle 200 is illustrated in FIG. 2 as a four-wheel sedan-type car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a wireless communication system 204, a RADAR unit 206, a laser rangefinder unit 208, and a camera 210. Furthermore, the example vehicle 200 can include any of the components described in connection with vehicle 100 of FIG. 1. The RADAR unit 206 and/or laser rangefinder unit 208 can actively scan the surrounding environment for the presence of potential obstacles and can be similar to the RADAR unit 126 and/or laser rangefinder/LIDAR unit 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include those locations illustrated in connection with RADAR unit 206 and laser rangefinder unit 208. Furthermore, each sensor of sensor unit 202 can be configured to be moved or scanned independently of other sensors of sensor unit 202.

The wireless communication system 204 can be located on a roof of the vehicle 200 as depicted in FIG. 2. Alternatively, the wireless communication system 204 can be located, fully or partially, elsewhere on the vehicle 200. The wireless communication system 204 may include wireless transmitters and receivers that may be configured to communicate with devices external or internal to the vehicle 200. Specifically, the wireless communication system 204 can include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc., that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. Accordingly, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200.

The camera 210 can have associated optics operable to provide an adjustable field of view. Further, the camera 210 can be mounted to vehicle 200 with a movable mount to vary a pointing angle of the camera 210, such as via a pan/tilt mechanism.

Figure 3:
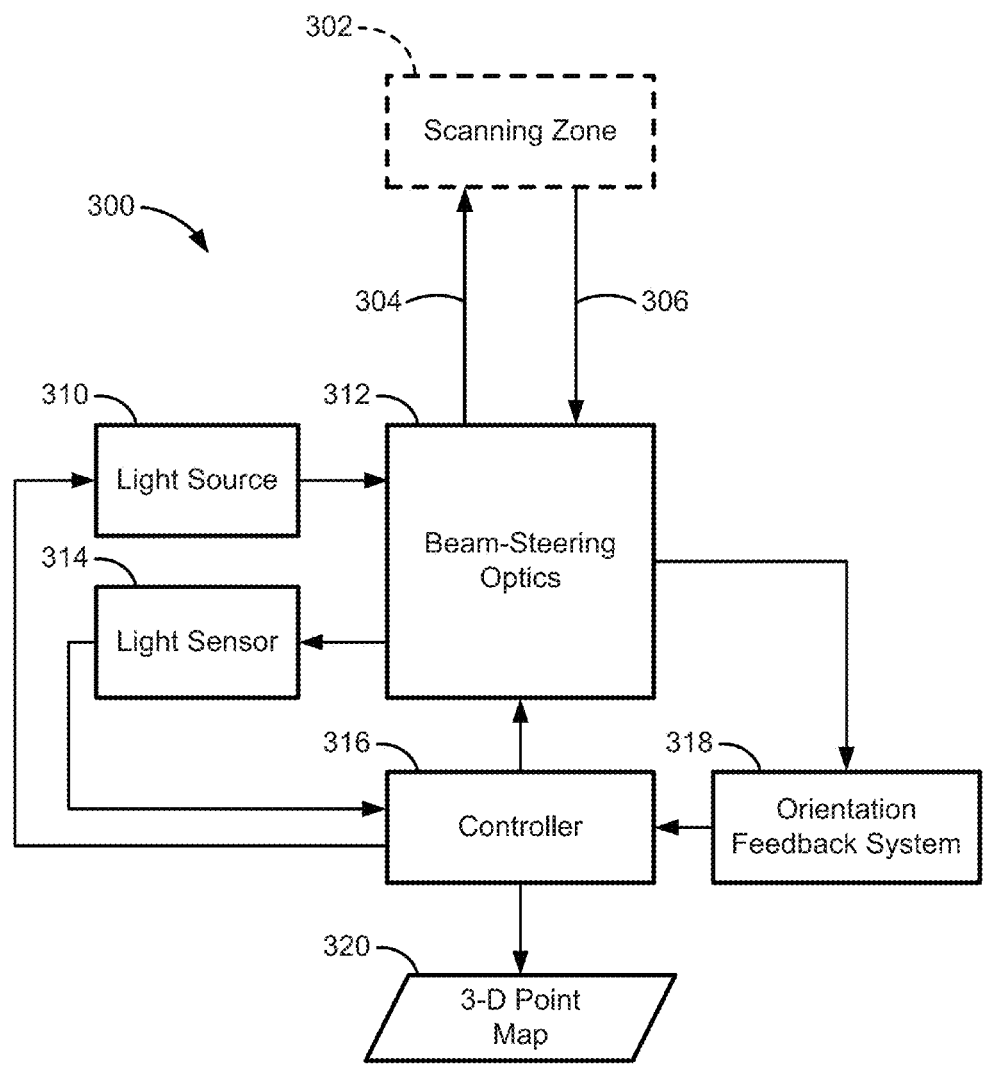
FIG. 3 is a block diagram of an example LIDAR system.

FIG. 3 is a block diagram of an example LIDAR device 300. The LIDAR device 300 includes a light source 310, beam-steering optics 312, a light sensor 314, and a controller 316. The light source 310 may emit pulses of light toward the beam-steering optics 312, which directs the pulses of light 304 across a scanning zone 302. Reflective features in the scanning zone 302 reflect the pulses of light 304 and the reflected light signals 306 can be detected by the light sensor 314. The controller 316 regulates the operation of the light source 310 and beam-steering optics 312 to scan pulses of light 304 across the scanning zone 302. The controller 316 can also be configured to estimate positions of reflective features in the scanning zone 302 based on the reflected signals 306 detected by the light sensor 314. For example, the controller 316 can measure the time delay between emission of a pulse of light and reception of a reflected light signal and determine the distance to the reflective feature based on the time of flight of a round trip to the reflective feature. In addition, the controller 316 may use the orientation of the beam-steering optics 312 at the time the pulse of light is emitted to estimate a direction toward the reflective feature. For example, an orientation feedback system 318 can send information to the controller 316 indicating the orientation of the beam-steering optics 312 (and thus the direction of the emitted pulse of light). The estimated direction (e.g., from the orientation feedback system 318) and estimated distance (e.g., based on a measured time delay) can be combined to estimate a three-dimensional position from which the returning light signal 306 was reflected. The controller 316 may combine a series of three-dimensional position estimations (e.g., from each received reflected light signal 306) from across the scanning zone 302 to generate a three-dimensional point map 320 of reflective features in the scanning zone 302.

The light source 310 can be a laser light source that emits light in the visible, infrared, and/or ultraviolet spectrum. Moreover, the light source 310 can optionally include a plurality of light sources each emitting pulses of light. In an example with multiple light sources, each light source may be directed to the scanning zone 302 by the beam-steering optics 312. For example, a group of light sources can each be aimed at a single rotating mirror. The group of light sources can be aimed such that each light source reflects from the mirror at a distinct angle and therefore scans a substantially distinct region of the scanning zone 302. Additionally or alternatively, the light sources may scan wholly or partially overlapping regions of the scanning zone 302. Additionally or alternatively, more than one beam-steering optical device can be provided, and each such beam-steering optical device can direct light pulses from one or more light sources.

As illustrated in FIG. 3, the reflected light signals may be directed to the light sensor 314 by the beam-steering optics 312. However, this is just one configuration provided for example purposes. Some embodiments of the LIDAR device 300 may be arranged with a light sensor configured to receive reflected light from the scanning zone 302 without first being directed via the beam-steering optics 312.

The controller 316 is configured to control the operation of the light source 310 and the beam-steering optics 312 to cause pulses of light 304 to be emitted across the scanning zone 302. The controller 316 also receives information from the light sensor 314 to indicate the reception of reflected light signals 306 at the light sensor 314. The controller 316 can then determine the distance to surrounding objects by determining the time delay between emission of a light pulse and reception of a corresponding reflected light signal. The time delay indicates the round trip travel time of the emitted light from the LIDAR device 300 and a reflective feature in the scanning zone 302. Thus, a distance to a reflective feature may be estimated by dividing the time delay by the speed of light, for example.

The three-dimensional position of the reflective feature can then be estimated by combining the estimated distance with the orientation of the beam-steering optics 312 during the emission of the pulse. In some examples, the orientation of the beam-steering optics 312 can be detected by an orientation feedback system 318 configured to sense the orientation of the beam-steering optics 312. The orientation feedback system 318 can then provide an indication of the orientation of the beam-steering optics 312 to the controller 316 and use the orientation information to estimate three-dimensional positions associated with received reflected light signals.

In some examples, by scanning the emitted pulses 304 across the scanning zone 302, the LIDAR device 300 can be used to locate reflective features in the scanning zone 302. Each reflected light signal received at the light sensor 314 may be associated with a three-dimensional point in space based on the measured time delay and orientation of the beam-steering optics 312 associated with each reflected light signal. The combined group of three-dimensional points following a scan of the scanning zone 302 can be combined together to create a 3-D point map 320, which may be output from the LIDAR device 300. The 3-D point map 320 may then be analyzed by one or more functional modules used to control an autonomous vehicle. For example, the 3-D point map 320 may be used by the obstacle avoidance system 144 and/or navigation/pathing system 142 in the vehicle 100 to identify obstacles surrounding the vehicle 100 and/or to control the vehicle 100 to avoid interference with such obstacles.

The beam-steering optics 312 may include one or more mirrors, lenses, filters, prisms, etc., configured to direct light pulses from the light source 310 to the scanning zone 302. The beam-steering optics 312 may be configured to direct the light pulses according to an orientation indicated by signals from the controller 316. For example, the beam-steering optics 312 may include one or more mirrors configured to rotate and/or oscillate according to signals from the controller 316. The controller 316 can thereby control the direction of emission of light pulse(s) 304 from the LIDAR device 300 by providing suitable control signals to the beam-steering optics 312.

The beam-steering optics 312 can be operated to scan the light from the light source 310 across the scanning zone 302 at a regular interval (e.g., to complete a full scan of the scanning zone 302 periodically). In this way, the LIDAR device 300 may be used to dynamically generate three-dimensional point maps of reflecting features in the scanning zone 302. The three-dimensional map may be updated at a frequency that is sufficient to provide information useful for real time navigation and/or obstacle avoidance for an autonomous vehicle (e.g., the autonomous vehicles 100, 200 discussed above in connection with FIGS. 1-2). For example, the 3-D point map 320 may be refreshed at a frequency of about 10 hertz to about 100 hertz and such refreshed point map information may be used to identify obstacles of an autonomous vehicle on which the LIDAR device 300 is mounted and then control the vehicle to avoid interference with such obstacles.

Figure 4A:
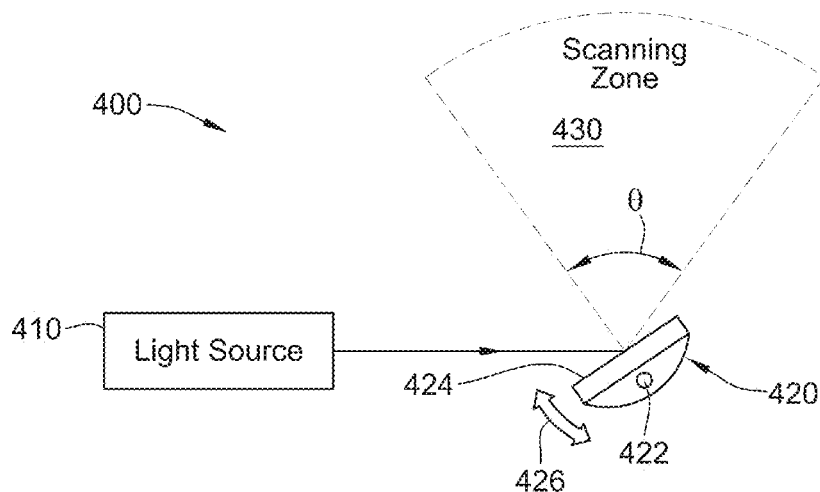
FIG. 4A is a diagram of an example LIDAR system that scans a scanning zone via an oscillating mirror.

FIG. 4A is a diagram of an example LIDAR system 400 that scans a scanning zone 430 via an oscillating mirror 420. The example LIDAR system 400 includes a light source 410 arranged to emit pulses of light at a reflective surface 424 of the oscillating mirror 420. The LIDAR system 400 may also include a light sensor (not shown), orientation feedback system (not shown), and controller (not shown), similar to those described above in connection with FIG. 3. Thus, the LIDAR system 400 illustrated in FIG. 4 may be configured to detect returning reflected light signals and use the reflected light signals to generate a three-dimensional point map of reflective features in the scanning zone 430.

The oscillating mirror 420 can rotate about its axis 422. The axis 422 may be defined by, for example, a pivot rod oriented parallel to the reflective surface 424 of the mirror 420. The oscillating mirror 420 can be driven to oscillate back and forth (as indicated by the motion arrow 426) such that the light from the light source 410 sweeps across an angle θ. The scanning zone 430 may therefore be a region defined by a cone having an apex approximately located at the oscillating mirror 420 and with opening angle θ. For example, the mirror 420 may be driven to oscillate with a frequency of about 60 hertz, which may also be the refresh rate of the LIDAR system 400.

Figure 4B:
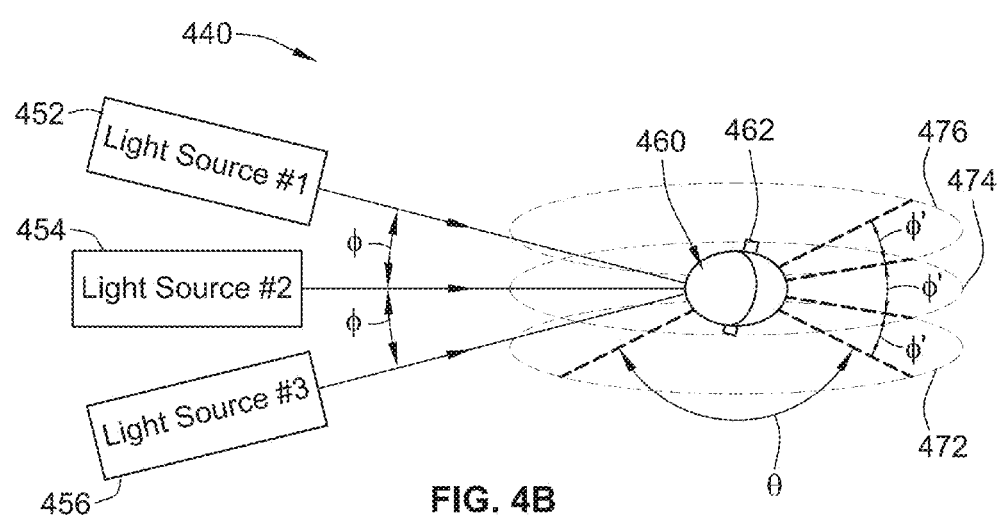
FIG. 4B is a diagram of an example LIDAR system that employs multiple light sources reflected from an oscillating mirror to scan a scanning zone.

FIG. 4B is a diagram of an example LIDAR system 440 with multiple light sources 452-456 each scanning a portion of a scanning zone. For example purposes, FIG. 4B shows the system 440 with three light sources (i.e., the first light source 452, second light source 454, and third light source 456). The light sources 452-456 can be arranged such that light emitted from each is directed toward a reflective side (not visible) of an oscillating mirror 460. The light sources 452-456 can each emit light from a distinct position such that pulses of light emitted from each of the light sources 452-456 define an angle with respect to one another. For example, the first light source 452 and second light source 454 can emit light from distinct positions that are separated by an angle ϕ when the light emitted from each is aimed at the oscillating mirror 460. Similarly, the second light source 454 and third light source 456 can be arranged such that light emitted from the two light sources 454, 456 defines an angle ϕ when the light emitted from each is aimed at the oscillating mirror 460. Thus, by steering light emitted from each light source (e.g., the light sources 452-456), the oscillating mirror 460 can scan each light source across a respective scanning zone (e.g., the scanning zones 472-476). The light sources 452-456 can be stacked in a vertical height direction substantially parallel to the axis of rotation 462 of the oscillating mirror. Thus, each of scanning zones 472-476 can have an azimuthal span due to the oscillation of the mirror 460 similar to the azimuthal span of the scanning zone 430 in FIG. 4A. For example, the scanning zones 472-476 can each azimuthally span the angle θ identified in FIG. 4B. In addition, the scanning zones 472-476 can be separated in altitude by a characteristic angle ϕ' that corresponds to the separation angle ϕ between the directions of the light sources 452-456. Accordingly, the azimuthal angular span of each scanning zone may be the same (e.g., θ). The angular separation between the light sources 452-456 (e.g., the angle ϕ) may cause the emitted light pulses from each of the light sources 452-456 to scan across a distinct scanning zone. Thus, each light source 452-456 can be associated with a distinct scanning zone. For example, the first light source 452 can be scanned across the first scanning zone 472; the second light source 454 can be scanned across the second scanning zone 474; and the third light source 456 can be scanned across the third scanning zone 476. Additionally or alternatively, the scanning zones (e.g., the scanning zones 472-476) may include at least partially overlapping regions, as illustrated for example purposes in FIG. 4B. The scanning zones 472-476 are identified separately for convenience in explaining the arrangement with multiple angularly offset light sources. However, it is noted that information from the multiple scanning zones can be combined (e.g., via a controller) to create a combined three-dimensional point map for use by navigation and/or obstacle avoidance systems of an autonomous vehicle (e.g., the autonomous vehicles 100, 200 described in connection with FIGS. 1 and 2 above).

The LIDAR system 440 is shown with three light sources (e.g., the light sources 452-456) each directed at a single oscillating mirror 460 to scan three scanning zones (e.g., the scanning zones 472-476). However, some embodiments of the present disclosure may include more than three light sources and more than three scanning zones. The oscillating mirror 460 may oscillate to cause the light from each light source to scan a region with an opening angle of approximately 8°. For example, the oscillating mirror 460 may oscillate back and forth plus and minus 4° from a nominal position such that the pulses of light from the light sources are scanned across their respective scanning zones with approximately 8° azimuthal angular span.

Figure 5A:
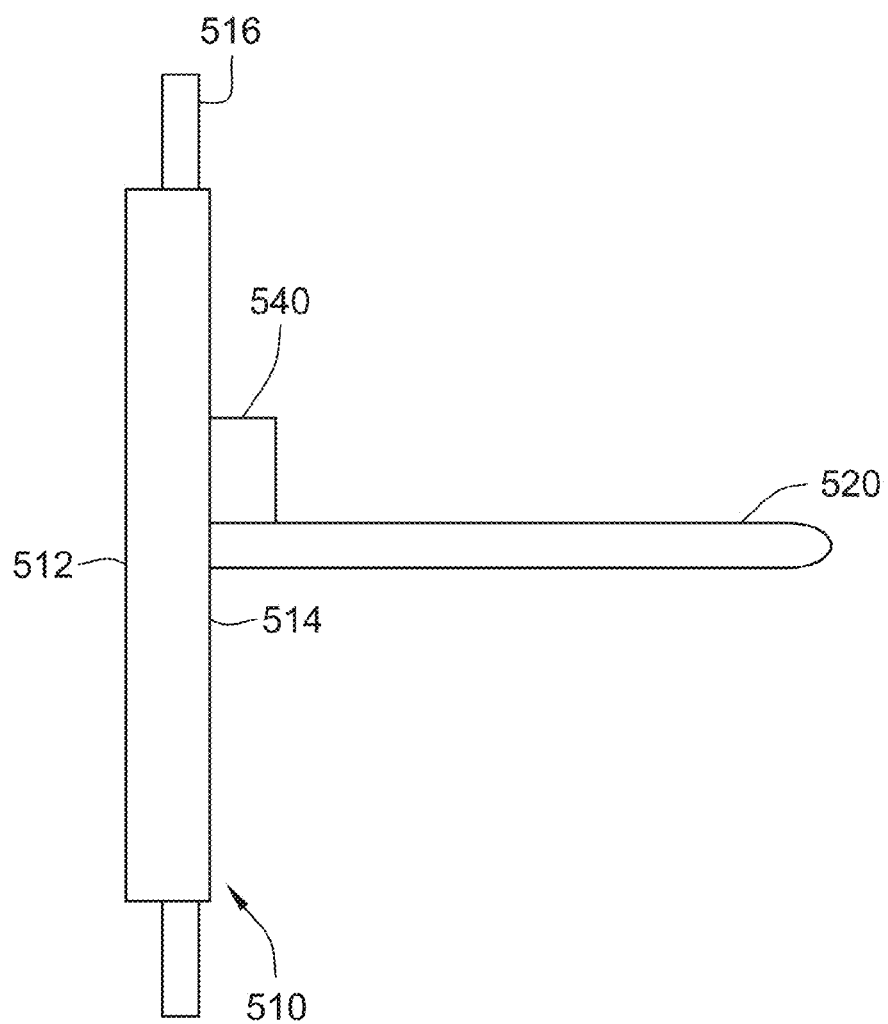
FIG. 5A is a side view of an example magnetically driven mirror.

FIG. 5A is a side view of an example magnetically driven mirror 510. The mirror 510 includes a mirror body with a reflective surface 512 and a back surface 514 opposite the reflective surface 512. The mirror 510 rotates about an axis of rotation parallel to the reflective surface. The axis of rotation is defined by a pivot rod 516. The pivot rod 516 may pass through the mirror body to allow the mirror body to rotate around the pivot rod 516 while the pivot rod 516 remains fixed. The pivot rod 516 may also be securely connected to the mirror body to allow the mirror body to rotate with the pivot rod 516. For example, the ends of the pivot rod 516 may be mounted to a housing so as to allow rotation, such as by seating the pivot rod 516 in divots to allow the pivot rot to rotate with respect to the housing, for example. A substrate 520 is connected to the back surface 514 of the mirror body. A conductive coil (e.g., the coil 530 shown in FIG. 5B) can be mounted on the substrate 520. The conductive coil can be operated by driving circuitry to cause the mirror 510 to undergo oscillatory motion about the axis of rotation defined by the pivot rod 516 due to interaction with a magnetic field surrounding the substrate 520. In some examples, the driving circuitry is situated off of the substrate 520 and electrically connected to the conductive coil through a cable connector 540, which may be mounted on the substrate 520 and/or the back surface 514 of the mirror body. In some examples, the electrical connection between the driving circuitry and the cable connector 540 is made by a wire and/or cable suitable for flexing to follow the oscillatory motion of the mirror 510, such as a flexible printed circuit (FPC) cable. Alternatively, the driving circuitry for the conductive coil can be mounted directly to the substrate 520, for example, at the location of the cable connector 540.

The reflective surface 512 of the mirror 510 can be a surface that reflects light emitted from a light source used in a LIDAR device, such as light with ultraviolet, visible, and/or infrared wavelength(s). In some examples, the mirror 510 can be formed of a glass material with a smooth and/or flat surface (e.g., formed by polishing) used to create the reflective surface 512. The reflective surface 512 may include a coating of reflective material, such as tin, aluminum, silver, gold, etc. applied to a surface of the mirror body. In some examples, a reflective layer (e.g., gold coating) can be applied to an outer surface of the mirror body material (e.g., glass, aluminum, etc.). Alternatively, a reflective layer can be applied to an inner surface of mirror body material, and the material of the mirror body (e.g., glass, aluminum, etc.) can then seal and/or protect the reflective layer from the ambient environment. Additionally, the reflective layer may be coated with a transparent coating to preserve the reflective layer by preventing oxidation and/or surface deformation, for example.

The substrate 520 can be a material suitable for mounting a conductive coil and/or other electrical components. For example, the substrate 520 may be a printed circuit board with wires and/or traces arranged in a coil of conductive material. The substrate 520 can be oriented in a plane substantially perpendicular to the axis of rotation of the mirror 510 (i.e., the pivot rod 516). The substrate 520 can also be oriented perpendicular to the plane of the reflective surface 512 of the mirror 510. Thus, a conductive coil disposed on the substrate 520 can be situated in a plane substantially perpendicular to the axis of rotation of the mirror 510. The substrate 520 can be mechanically connected to the back surface 514 of the mirror body using one or more adhesives, fasteners, and/or other mounting techniques In some embodiments, the pivot rod 516 defining the axis of rotation of the mirror 510 is situated between the reflective surface 512 of the mirror 510 and the substrate 520. For example, the pivot rod 516 may pass through the body of the mirror 510 (e.g., between the reflective surface 512 and the back surface 514). Situating the axis of rotation of the mirror 510 to pass through the mirror body may provide a relatively low moment of inertia for the rotating system and thereby enhance the responsiveness of the system and/or reduce the power needed to drive the oscillation. The axis of rotation of the mirror 510 may, for example, be situated near the center of mass of the rotating system (e.g., the combination of the mirror 510 and the substrate 520).

Figure 5B:
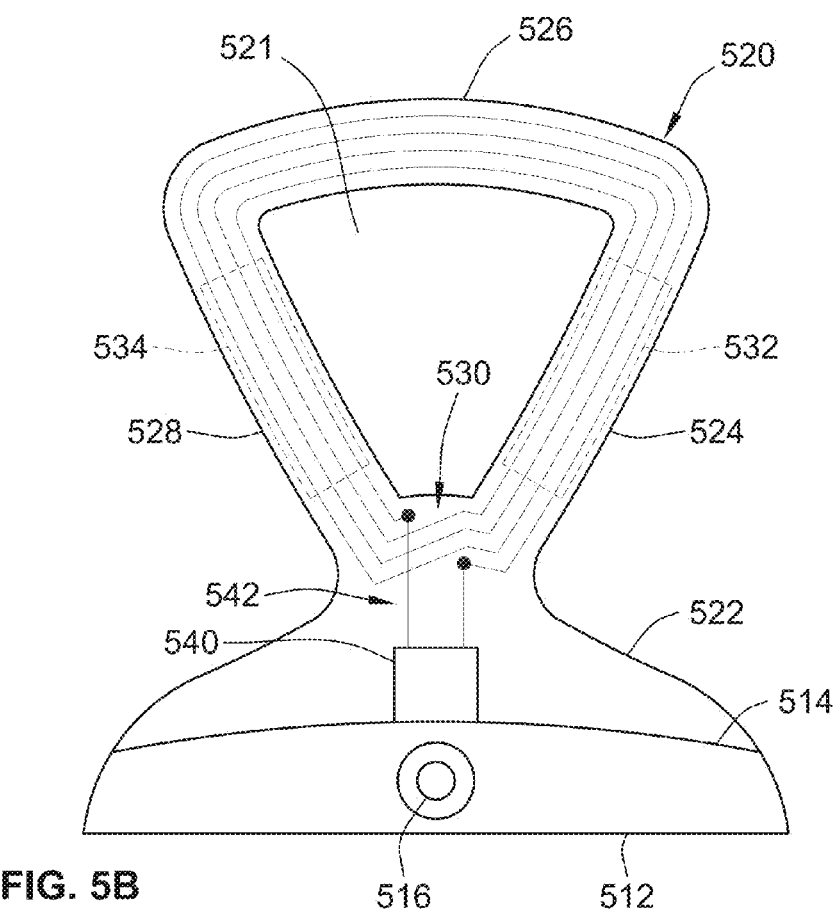
FIG. 5B is a top view of the example magnetically driven mirror shown in FIG. 5A.

FIG. 5B is a top view of the example magnetically driven mirror 510 shown in FIG. 5A. The substrate 520 includes a conductive coil 530 that can be electrically connected to the cable connector 540 by leads 542. The substrate 520 includes a mirror-proximate shoulder section 522 that is mechanically connected to the back surface 514 of the mirror body (e.g., by adhesives, fasteners, etc.). The shoulder section 522 may provide a mounting surface for the cable connector 540 that operates the conductive coil 530 via the leads 542.

The conductive coil 530 and/or leads 542 can be formed of wires and/or traces of conductive material arranged in a continuous coil around the perimeter of the substrate 520. In this example, the conductive coil 530 is arranged along the perimeter of the substrate 520, and the substrate 520 has a central cut-out (e.g., an aperture 521) from the region surrounded by the conductive coil 530. Incorporating a central cut-out may, for example, reduce the mass of the substrate 520 and thus the moment of inertia of the mirror 510. Accordingly, the conductive coil 530 can be disposed on portions of the substrate 520 surrounding the central cut-out. For example, the substrate 520 can have a first radial leg 524 and a second radial leg 528 joined by an outer concentric side 526. The first and second radial legs 524, 528 can extend along respective radial lines that pass through the axis of rotation of the mirror 510 (e.g., defined by the pivot rod 516). That is, the first and second radial legs 524, 528 can each be connected to the shoulder section 522 and extend to a position distal the mirror 510 along respective lines that are substantially along a radial direction with respect to the axis of rotation of the mirror 510. The outer concentric side 526 can connect the mirror-distal positions of the two radial legs 524, 528. The outer concentric side 526 may extend along a concentric ring centered on the axis of rotation of the mirror 510 (e.g., defined by the pivot rod 516).

The conductive coil 530 can be wrapped along the path defined by the first and second radial legs 524, 528 and the outer concentric side 526 of the substrate 520. For example, the conductive coil 530 can include a first radial section 532 that includes the length of conductive material that is situated along the first radial leg 524 of the substrate 520. Similarly, a second radial section 534 of the conductive coil 530 includes the length of conductive material that is situated along the second radial leg 528 of the substrate 520. The current through the first and second radial sections 532, 534 is given by the current through the coil 530 multiplied by the number of windings in the coil 530.

The current along the first radial section 532 is oriented substantially perpendicular to the axis of rotation of the mirror 510. The current along the second radial section 534 is also oriented substantially perpendicular to the axis of rotation of the mirror 510. In the presence of a suitable magnetic field oriented perpendicular to the plane of the substrate 520 (e.g., into and/or out of the page as shown in FIG. 5B), current through the conductive coil 530 can generate a Lorentz force that urges the mirror to rotate about its axis of rotation (e.g., defined by the pivot rod 516). For example, a magnetic field that is oriented into the page near the first radial section 532 and out of the page near the second radial section 534 can interact with a clockwise-circulating current in the coil 530 to urge the mirror 510 to rotate in a clockwise direction. In particular, the Lorentz forces from the two radial sections 532, 534 while current in the coil 530 is flowing in a clockwise direction each contribute a clockwise-directed torque on the mirror 510. Moreover, changing the direction the current to circulate in a counter-clockwise direction generates torque on the mirror 510 in a counter-clockwise direction. Thus, applying an alternating current to the conductive coil 530 while the substrate 520 is in the presence of a suitable magnetic field can cause the mirror to undergo oscillatory motion. It is noted that the above discussion of clockwise and counter-clockwise orientations is provided only for convenience in reference to the view illustrated by FIG. 5B. An example of the forces acting on the two radial sections 532, 534 is described further below in connection with FIGS. 5F to 5H.

The coil 530 in FIG. 5B is illustrated to show four windings around the perimeter of the substrate 520, but this is only for convenience in illustration and explanation. Other embodiments may include a conductive coil that has a greater or fewer number of windings.

Figure 5C:
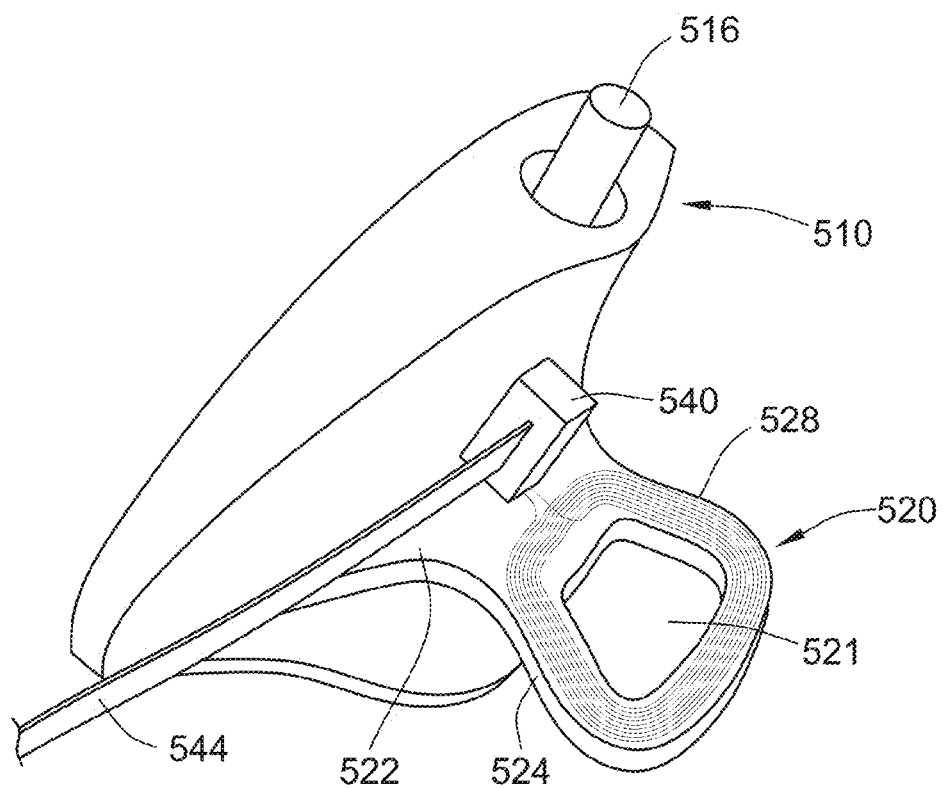
FIG. 5C is a rear aspect view of the example magnetically driven mirror shown in FIGS. 5A and 5B.

FIG. 5C is a rear aspect view of the example magnetically driven mirror 510 shown in FIGS. 5A and 5B. As shown in FIG. 5C, the cable connector 540 may receive external driving signals from a cable 544. The cable 544 can be flexible and arranged with enough slack to remain connected to the cable connector 540 while the mirror 510 undergoes oscillatory motion. In some examples, driving circuitry to operate the conductive coil 530 can be located off of the substrate 520, such as at the not shown end of the cable 544. Driving signals to operate conductive coil 530 (e.g., an alternating current signal) may then be passed through the cable 544 to the coil 530 via the cable connector 540, for example.

In some examples, the substrate 520 is arranged in an outline of a wedge (e.g., similar to a pie slice) with the two radial sections 524, 528 forming sides, and the outer concentric side 526 forming an outer border. The arrangement allows the length of coil along the radial sections 532, 534 to carry current substantially in a radial direction with respect to the axis of rotation of the mirror 510 while the remaining portions of the coil 530 (e.g., along the outer concentric side 526 and the connection between the radial sections) carry current without a significant radial component. The shape of the conductive coil 530 may be similar to conductive coils used to drive cones for sound generation in loudspeakers (e.g., "voice coils"). The shape of the conductive coil 530 may also be similar to conductive coils used to operate rotating arms in hard drive disks.

Figure 5D:
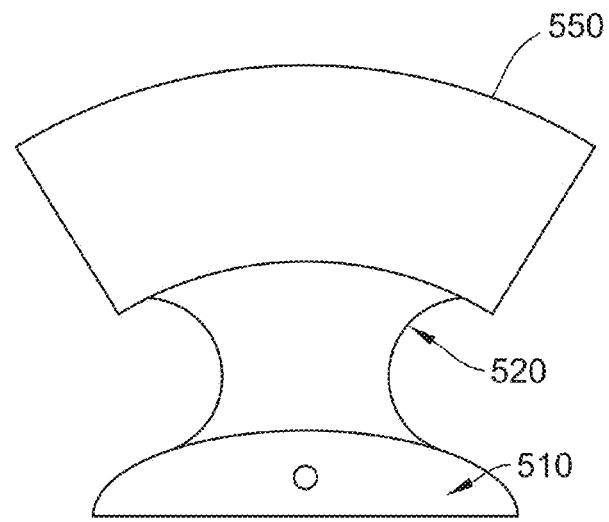
FIG. 5D is a top view of the example magnetically driven mirror shown in FIGS. 5A-5C showing a magnetic circuit containing yoke.

FIG. 5D is a top view of the example magnetically driven mirror 510 shown in FIGS. 5A-5C showing a magnetic circuit containing yoke 550. The yoke 550 can have an inner channel between a top portion (visible in FIG. 5D) and a bottom portion. The inner channel can receive the substrate 520 and allow enough space for the substrate 520 to move back and forth while the mirror 510 oscillates about its axis of rotation (e.g., defined by the pivot rod 516).

Figure 5E:
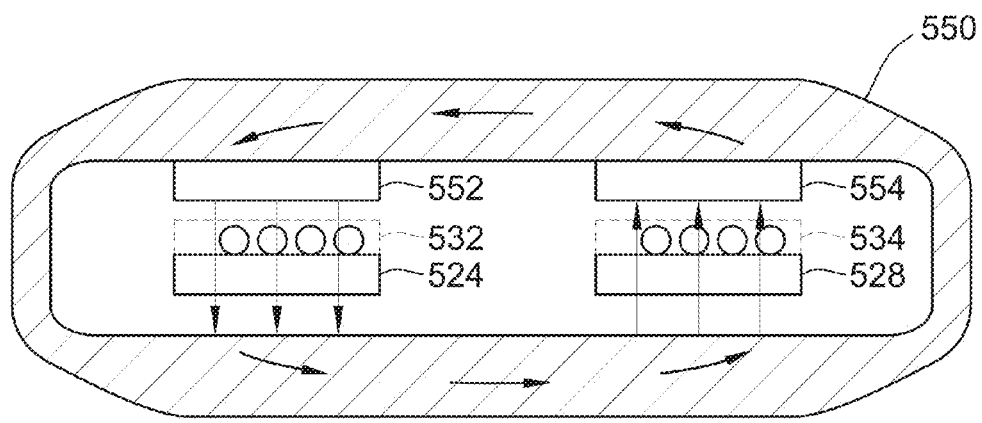
FIG. 5E is a cross-sectional view illustrating an example arrangement of permanent magnets mounted to the yoke to generate a magnetic field for interacting with the conductive coil connected to the example magnetically driven mirror.

FIG. 5E is a cross-sectional view illustrating an example arrangement of permanent magnets 552, 554 mounted to the yoke 550 to generate a magnetic field for interacting with the conductive coil 530 connected to the example magnetically driven mirror 510. The view in FIG. 5E depicts a view from the mirror-distal end of the substrate 520 while looking toward the mirror 510 at a cross-sectional plane perpendicular to the plane of the substrate 520. An arrangement of one or more magnets 552, 554 can be mounted to an inner surface of the yoke 550 to create a magnetic field that is substantially perpendicular to the plane of the substrate 520. The yoke 550 can be a ferromagnetic material, such as nickel, iron, etc., that is situated to surround the conductive coil 530 disposed on the substrate 520. For example, the yoke 550 and one or more magnets can create a magnetic field that is substantially parallel to the axis of rotation of the mirror 510, and thus perpendicular to the plane of the substrate 520, in the neighborhood of the radial sections 532, 534 of the conductive coil 530.

In some examples, the magnets 552, 554 can be oriented to create a magnetic field with opposite direction at the two radial sections 532, 534 of the conductive coil 530. That is, the magnetic field within the inner channel of the yoke 550 can have a first direction in the vicinity of the first radial section 532 and an opposite direction (e.g., an anti-parallel direction) in the vicinity of the second radial section 534. In such an arrangement, torque applied to the mirror 510 due to Lorentz forces from the two radial sections 532, 534 of the conductive coil 530 urge the mirror to rotate in the same direction. Because the current in the coil 530 circulates in opposite radial directions through the two radial sections 532, 534 at any given instant, and the Lorentz force is defined by a vector cross product with current and the magnetic field, torque applied to the mirror 510 from the two radial sections 532, 534 is additive when the magnetic field in the vicinity of the two radial sections 532, 534 has opposite directions.

For example, as shown in FIG. 5E, the two magnets 532, 534 can each be mounted to an inner surface of the yoke 550 (e.g., along the inner wall of the top portion of the yoke 550 that receives the substrate 520). The first magnet 552 can be situated in the vicinity of a nominal position of the first radial section 532 of the conductive coil 530 (e.g., on the inner surface of the top portion of the yoke 550). The first magnet 552 can be oriented with its North polarity faced toward the first radial leg 524 of the substrate 520 such that magnetic field lines in the vicinity of the first radial leg 524 pass through the inner channel directed from the top portion to the bottom portion of the yoke 550. The second magnet 554 can be situated in the vicinity of the nominal position of the second radial section 534 of the conductive coil 530 (e.g., on the inner surface of the top portion of the yoke 550). The second magnet 554 can be oriented with its South polarity faced toward the second radial leg 528 of the substrate 520 such that magnetic field lines in the vicinity of the second radial leg 528 pass through the inner channel directed from the bottom portion to the top portion of the yoke 550.

The yoke 550 can substantially contain the magnetic field associated with the magnets 552, 554 to the inner channel region (e.g., the area through which the substrate 520 moves during oscillation) due to the ferromagnetic material of the yoke 550 completing a magnetic circuit between the two magnets 552, 554. The field containing effects of the yoke 550 is illustrated in FIG. 5E by the arrows indicating magnetic field direction that are directed through the interior of the yoke 550 between the two magnets 552, 554. The magnets 552, 554 can be permanent magnets or electromagnets. In some examples, the magnets 552, 554 can be rare earth magnets, such as neodymium magnets, etc.

In some examples, the yoke 550 and associated magnets 552, 554 may be mounted to a common housing of the magnetically driven mirror 510. For example, the yoke 550 may be incorporated in, or fixed with respect to, a housing that mounts to the pivot rod 516 of the mirror 510 so as to allow the mirror 510 to rotate with respect to the housing. The housing may also include the driving circuitry for operating the conductive coil 530. For example, a control board may be mounted to the housing that includes driving circuitry connected to the cable connector 540 on the substrate 520 by a flexible cable (e.g., an FPC cable). Thus, the mirror 510 may be allowed to rotate with respect to the yoke 550 (and its associated housing). Such a housing for the magnetically driven mirror 510 may be included in, for example, the top-mounted sensor unit 202 of the vehicle 200 described in connection with FIG. 2.

According to some embodiments of the present disclosure, a rotating mirror system for a LIDAR device is described herein. An example rotating mirror system may include the mirror 510, the conductive coil 530, driving circuitry, and the magnets 552, 554. The mirror 510 can be configured to rotate about its axis of rotation defined by the pivot rod 516. The mirror 510 can be urged to rotate by interactions between the conductive coil 530 and the magnetic field associated with the magnets 552, 554 (and the yoke 550). Moreover, the conductive coil 530 may be operated according to signals from the driving circuitry, which may be conveyed through the cable connector 540.

In an alternative configuration, the substrate 520 may include one or more permanent magnets, such as rare earth magnets, arranged to provide anti-parallel magnetic fields on the radial arms 524, 528 of the substrate. In such a configuration, at least one conductive coil can be situated above and/or below the substrate to create torque on the mirror 510 by interacting with the arrangement of magnets on the substrate 520. Thus, while some aspects of the present disclosure describes a conductive coil attached to an oscillating mirror in the presence of fixed magnets, some embodiments may include an arrangement of magnets attached to the oscillating mirror in the presence of a fixed conductive coil. Mounting the magnets to the substrate 520 may thereby allow for situating the conductive coil and associated driving circuitry on a non-moving component, such as a control board not attached to the mirror 510. Thus, the mirror 510 and its associated oscillating components may not be connected to any external driving signals, by a flexible cable or otherwise. In either arrangement, the conductive coil may be driven with an oscillating current to generate an oscillating electromagnetic force on the mirror that causes the mirror to undergo oscillatory motion.

Figures 5F, 5G, 5H:
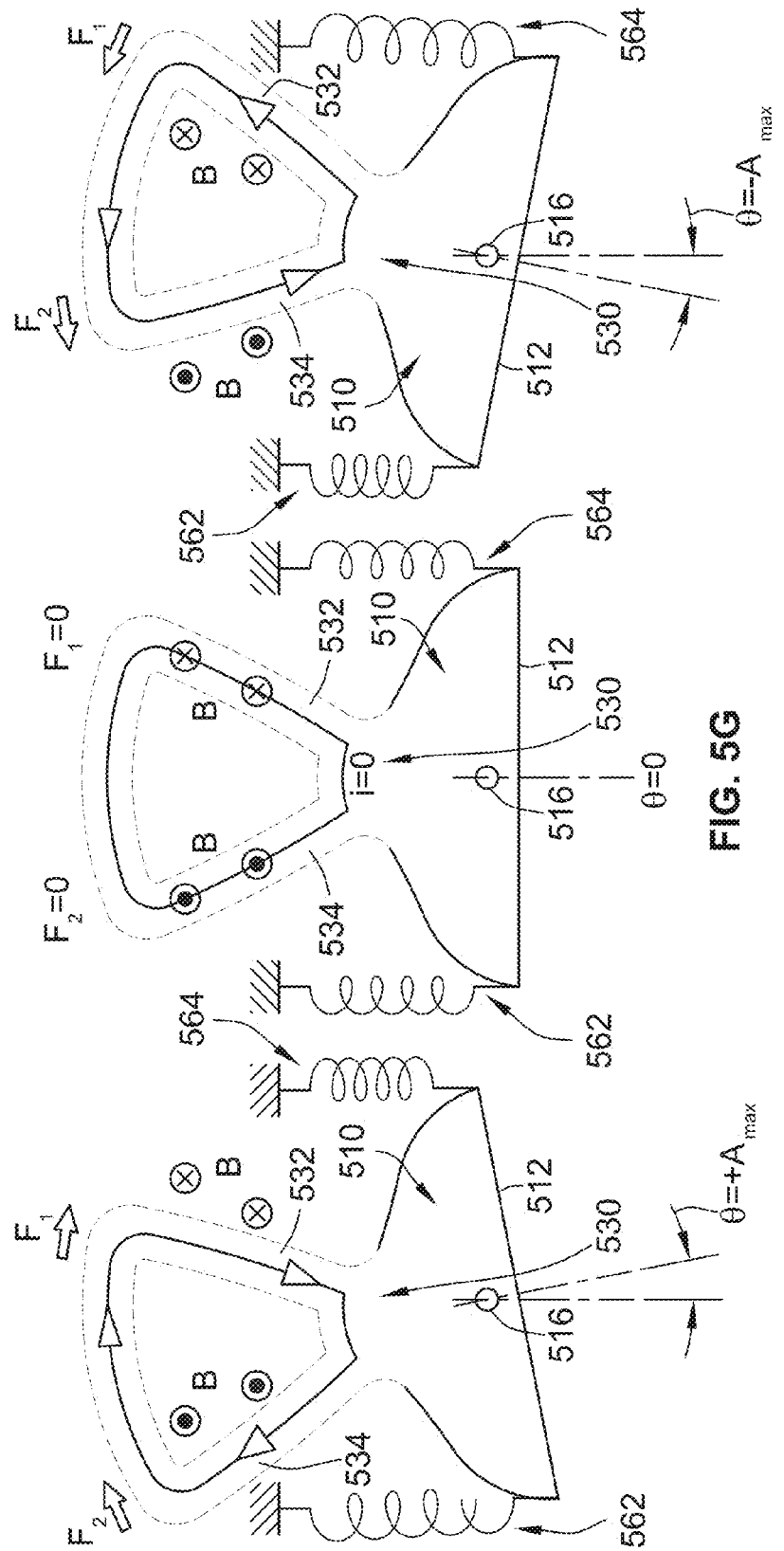
FIG. 5F is a diagram illustrating example current direction, magnetic field direction, and force direction with the mirror at a maximum displacement angle.
FIG. 5G is a diagram illustrating example current direction, magnetic field direction, and force direction with the mirror at zero displacement angle.
FIG. 5H is a diagram illustrating example current direction, magnetic field direction, and force direction with the mirror at a maximum negative displacement angle.

FIGS. 5F-5H illustrate three phases of oscillatory motion where the conductive coil is driven with an alternating current to provide a force that causes the mirror 510 to oscillate about the pivot rod 516. Tension springs 562, 564 are connected between the outer back side edges of the mirror 510 and anchor points, such as on a housing, to facilitate resonant oscillation of the oscillating mirror 510. The tension springs 562, 564 can be connected to near outer sides of the mirror 510 distal from the pivot rod 516.

FIG. 5F is a diagram illustrating example current direction, magnetic field direction, and force direction with the mirror 510 at a maximum displacement angle $\theta=+A_{max}$. FIG. 5G is a diagram illustrating example current direction, magnetic field direction, and force direction with the mirror 510 at zero displacement angle $\theta=0$. FIG. 5H is a diagram illustrating example current direction, magnetic field direction, and force direction with the mirror 510 at a maximum negative displacement angle $\theta=-A_{max}$. The displacement angle $\theta$ referred to in connection with FIGS. 5F-5H is defined by the angle between the normal direction of the reflective surface 512 of the mirror and a nominal position of the mirror 510 (FIG. 5G). As shown in FIGS. 5F-5H a change in orientation angle of the rotating mirror system results in a corresponding change in the orientation angle of the normal direction of the reflective surface 512 of the mirror 510.

The Lorentz force is given by a vector cross product $F=N\, i\, l\times B$, with N the number of windings, i the current through the coil, l the length of the current-carrying portion, and B the magnetic field. In estimating the torque applied to the mirror 510, the Lorentz force along the portion of the coil 530 following the outer concentric side 526 of the substrate 520 and the portion of the coil 530 connecting the two radial sections 532, 534 along the shoulder portion 522 can each be ignored, because the concentric regions of the conductive coil do not have a significant radial component and therefore do not contribute significantly to the torque. The Lorentz force due to the radial sections 532, 534 of the coil 530 interacting with the magnetic field (and thus the torque on the mirror 510) can be approximated in the case where the magnetic field is directed approximately as shown in FIG. 5E. The magnetic field direction is represented in FIGS. 5F-5G by arrow heads (circle with a dot) representing the magnetic field coming out of the page near the second radial portion 534 and with arrow tails (circle with an x) representing the magnetic field going into the page near the first radial portion 532.

The force on the first radial section 532 is represented by the block arrow labeled $F_1$. The force on the second radial section 534 is represented by the block arrow labeled $F_2$. The direction of the force $F_1$ on the first radial section 532 is given by a vector cross product between the direction of current in the first radial section 532 and the direction of the local magnetic field (e.g., into the page). The direction of the force $F_2$ on the second radial section 534 is given by a vector cross product between the direction of current in the second radial section 534 and the direction of the local magnetic field (e.g., out of the page).

In FIG. 5F, the mirror 510 reaches a maximum positive displacement angle (e.g., $\theta=+A\text{max}$) and the current through the coil 530 can be driven in a clockwise direction to provide a torque that urges the mirror 510 to change its direction of rotation (i.e., to rotate toward the $\theta=0$ position shown in FIG. 5G). The clockwise current i results in forces $F_1$ on the first radial section 532 and $F_2$ on the second radial section 534. The forces $F_1$ and $F_2$ combine to urge the substrate 520 to rotate the mirror 510 back toward its nominal position. In the maximum positive displacement angle position shown in FIG. 5F, the two tension springs 562, 564 can each be urging the mirror 510 to return to its nominal position. For example, the first tension spring 562 can be stretched beyond its relaxed length so as to pull the side edge of the mirror 510 toward the anchor point of the first tension spring 562. At the same time, the second tension spring 564 can be compressed below its relaxed length so as to push the opposite side edge of the mirror 510 away from the anchor point of the second tension spring 564.

In FIG. 5G, the mirror 510 is at its nominal position (e.g., $\theta=0$). At this position, the current through the coil 530 may be approximately zero, such as occurs when switching between current directions in an alternating current driving scheme. In the nominal position shown in FIG. 5G, the two tension springs 562, 564 can each be in a relaxed state such that the springs are not urging the mirror to rotate in FIG. 5G.

In FIG. 5H, the mirror 510 is at its maximum negative displacement angle (e.g., $\theta=-A\text{max}$) and the current through the coil 530 can be driven in a counter-clockwise direction to provide a torque that urges the mirror 510 to changes direction of rotation (i.e., to rotate toward the $\theta=0$ position shown in FIG. 5G). The counter-clockwise current i results in forces $F_1$ on the first radial section 532 and $F_2$ on the second radial section 534. The forces $F_1$ and $F_2$ combine to urge the substrate 520 to rotate the mirror 510 back toward its nominal position. It is noted that the torque on the mirror 510 in FIG. 5H is in the opposite direction of the torque on the mirror 510 in FIG. 5F, due to the opposite directions of the current i (e.g., from clockwise in FIG. 5F to counter-clockwise in FIG. 5H). However, once the mirror 510 changes direction, the torque contributed by the side arms can continue to accelerate the mirror 510 toward its nominal position. The mirror 510 can thereby reach its nominal position with sufficient inertia to rotate past nominal position, at which point the forces urging the mirror 510 to again change its rotation direction. In the maximum negative displacement angle position shown in FIG. 5H, the two tension springs 562, 564 can each be urging the mirror 510 to return to its nominal position. For example, the first tension spring 562 can be compressed below its relaxed length so as to push the side edge of the mirror 510 away from the anchor point of the first tension spring 562. At the same time, the second tension spring 564 can be stretched beyond its relaxed length so as to pull the opposite side edge of the mirror 510 toward from the anchor point of the second tension spring 564.

The views in FIGS. 5F-5H can be considered three sequential positions in oscillatory motion undergone by the mirror 510, with amplitude Amax and frequency given by the frequency of the alternating current i. In some examples, the coil 530 is driven with an alternating current with a sinusoidal pattern. The mirror 510 can undergo oscillatory motion with maxima (or minima) in the driving current corresponding to maxima (or minima) in the deflection angle (e.g., at $\theta=\pm A\text{max}$), and the driving current passing through zero while the mirror sweeps past its nominal position ($\theta=0$).

Generally, the amplitude and frequency of the oscillating mirror 510 may depend in part on the current applied to the coil 530, the moment of inertia of the oscillating mirror system, the resonant frequency of the oscillating mirror system, the drag on the rotation of the oscillating mirror system, such as due to friction, etc. In some examples, the oscillatory motion can be further influenced ("tuned") to achieve desired parameters by adding resonance features, such as the tension springs 562, 564, etc. to achieve a desired the oscillatory resonance response of the mirror 510. Thus, while other factors may also influence the responsiveness of the mirror 510, the alternating current i applied to the conductive coil 530 by the driving circuitry is a driving signal that causes the mirror 510 to oscillate about its axis of rotation (e.g., defined by the pivot rod 516). In some embodiments, adjusting the frequency and amplitude of the applied alternating current can result in an associated adjustment in frequency and amplitude of the oscillatory motion of the mirror 510.

In some embodiments, the magnetically driven mirror 510 is operated to oscillate so as to direct light pulses in a LIDAR system to scan a scanning zone, similar to the discussion of LIDAR systems above in connection with FIGS. 3-4. In an example, the rotating mirror system described herein can be driven to scan across a scanning zone with a 20 degree opening angle (e.g., by driving the conductive coil 530 to create oscillations in the angle of deflection between +10 degrees and −10 degrees). In another example, the rotating mirror system described herein can be driven to scan across a scanning zone with an 8 degree opening angle (e.g., by driving the conductive coil 530 to create oscillations in the angle of deflection between +4 degrees and −4 degrees). The rotating mirror system described herein may also be oscillated with other amplitudes to scan scanning zones with larger or smaller opening angles, such as scanning zones with opening angles between 1 degree and 90 degrees, for example. Moreover, the rotating mirror system can be driven with a frequency that allows for a refresh rate of an output 3-D point map data from the LIDAR system to be relevant to real-time navigation and/or obstacle avoidance determinations by an associated autonomous vehicle. For example, the mirror 510 may be oscillated with a frequency of approximately 60 Hertz to allow a LIDAR scan to be refreshed at a rate of approximately 60 Hertz. In other examples, the mirror 510 may be oscillated with a frequency of approximately 200 Hertz. Other frequency values may be used to achieve desired performance characteristics, such as, without limitation, frequencies between 60 Hertz and 200 Hertz. The amplitude of the alternating current may be limited by thermal heating effects in the coil 530 at high current levels.

The driving circuitry used to operate the oscillating mirror 510 can be a source of alternating current and may be adjustable. For example, the frequency and/or amplitude of the alternating current applied to the coil 530 may be adjusted to achieve desired performance of the system. The driving circuitry can be selected with operation parameters sufficient to allow operation in the presence of voltages generated by the motion of the coil 530 in the magnetic field. For example, the driving circuitry may be subjected to an electromotive voltage due to the time-changing magnetic flux through the coil 530 as the mirror 510 oscillates back and forth.

Figure 6A:
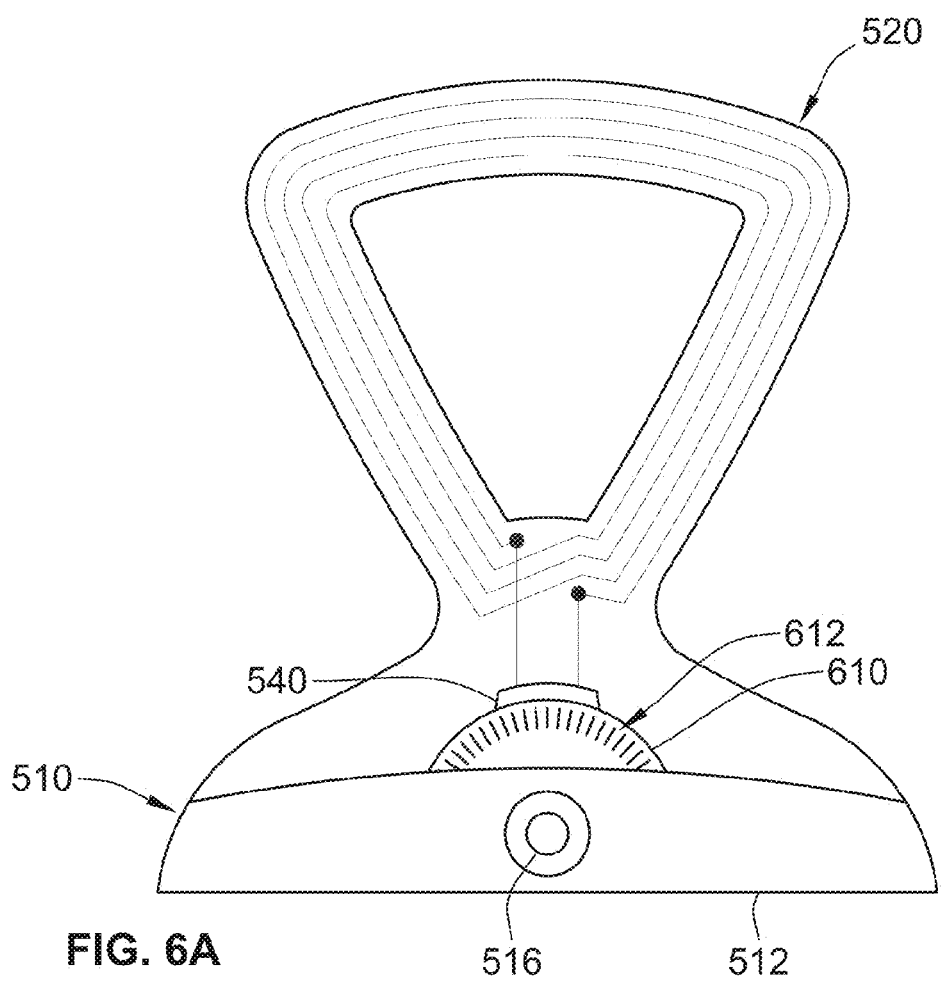
FIG. 6A shows a disk for an optical encoder connected to the example magnetically driven mirror shown in FIG. 5.

FIG. 6A shows a disk 610 for an optical encoder connected to the example magnetically driven mirror 510 shown in FIG. 5. The disk 610 can be fixed to the mirror 610, such as by mounting the disk 610 to the back surface 514 of the mirror body or the pivot rod 516, for example. The disk 610 can include a pattern 612 that is detected by a light sensor (not shown) to indicate the orientation angle of the mirror system. The light sensor can be mounted to a non-rotating portion of the mirror system, such as a point fixed with respect to the magnetic yoke 550.

The light sensor (not shown) can be positioned to detect changes in the pattern 612 on the disk 610 and thereby determine the orientation of the mirror 510. The light sensor may be mounted, for example, to a control board associated with the mirror 510 that also includes driving circuitry for operating the conductive coil 530. The pattern 612 in the disk 610 may include a series of slots cut into the perimeter of the disk 610. Additionally or alternatively, the pattern 612 may include a series of tick marks or other indicators that can be detected by the light sensor. In some examples, the pattern 612 can include a regularly repeating pattern along the perimeter of the disk 610. Output from the light sensor can be analyzed to determine the orientation angle of the mirror. For example, the light sensor output can be analyzed to identify a portion of the pattern 612 aligned with the light sensor, and the identified portion can be associated with an orientation of the mirror 510. The association between portions of the pattern 612 and orientation angles may be carried out according to, for example, calibration data, pre-determined relationships, etc. The optical encoder can thereby be used to provide orientation feedback information on the orientation angle of the mirror 510 (e.g., similar to the orientation feedback system 318 in the LIDAR system 300 described above in connection with FIG. 3).

In some examples, the disk 610 can be mounted such that the center of the disk 610 is co-aligned with the axis of rotation of the mirror 510. Thus, a change in orientation angle of the mirror 610 may cause a corresponding change in orientation of the disk 610, and thus a change in the portion of the pattern 612 detected by the light sensor.

Figure 6B:
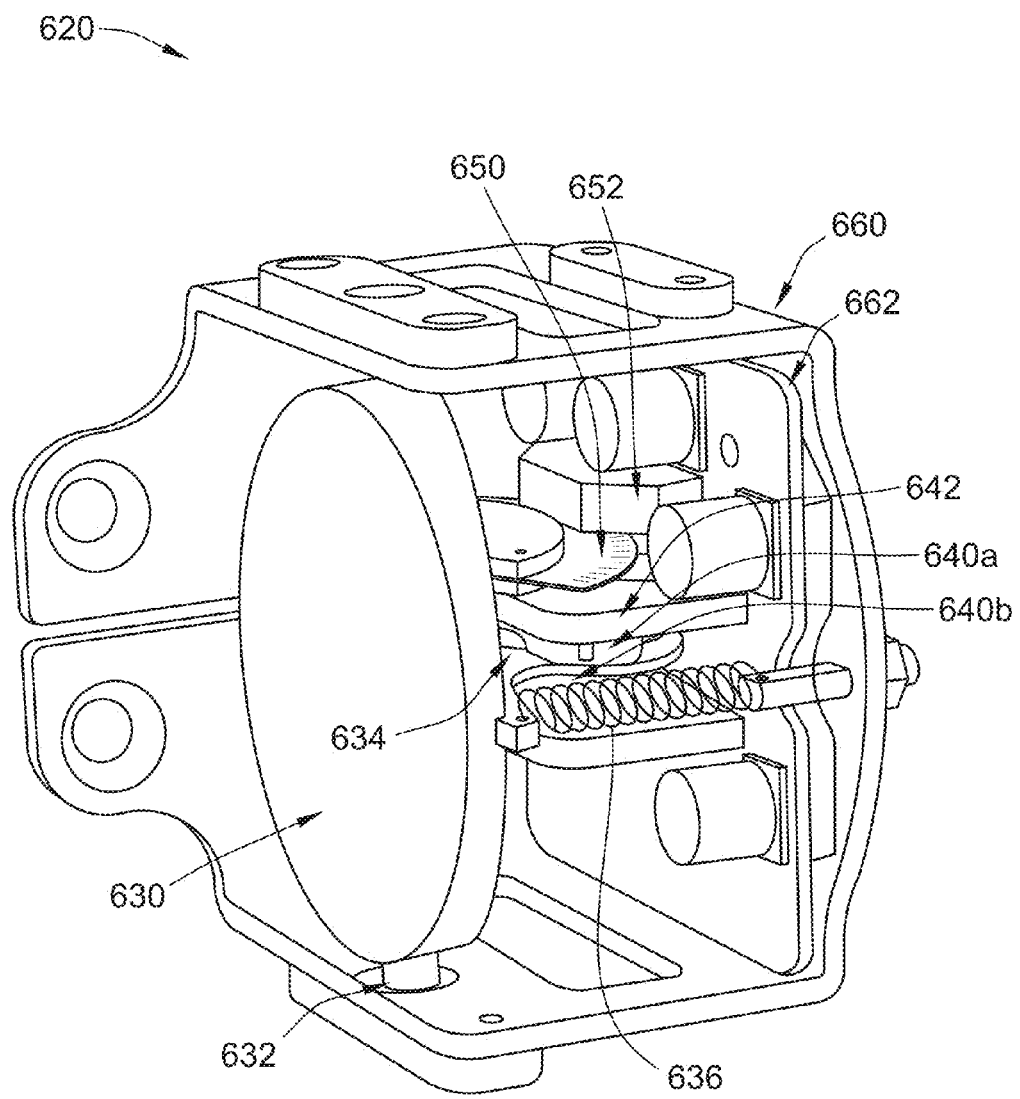
FIG. 6B shows an assembled oscillating mirror system according to an example embodiment.

FIG. 6B shows an assembled oscillating mirror system 620 according to an example embodiment. The mirror system 620 includes a mirror 630 situated to oscillate about an axis of rotation defined by a pivot rod 622. The mirror 630 is rotatably mounted to a housing 660 by respective apertures that receive the ends of the pivot rod 622. A substrate 634 is connected to the back, non-reflective side of the body of the mirror 630. The substrate 634 is situated between a magnetic yoke 642 on which is mounted an arrangement of magnets 640a, 640b above and below the substrate 634, respectively. The substrate 634 includes a conductive coil that electromagnetically interacts with the arrangement of magnets 640a, 640b to cause the mirror 630 to oscillate. The conductive coil on the substrate 634 can have a pair of radially extended side arms, similar to the substrate 520 described above in connection with FIG. 5m, for example. The arrangement of magnets 640a, 640b and the yoke 642 can combine to create a magnetic field that is oriented in antiparallel directions at the two side arms of the conductive coil, similar to the arrangement of the magnetic field described in connection with FIG. 5, for example.

A tension spring 636 connects the outer side edge of the mirror 630 to the housing 660 (e.g., via an adjustable anchoring screw) to create a resonance response in the oscillation of the mirror 630. The tension spring 636 can be connected to a point on the substrate 634 near the outer side edge of the mirror 630 at a position distal from the axis of rotation. A second tension spring (not visible) can be connected to the opposite side of the mirror 630 and anchored to the housing 660 such that the mirror 630 has a resonance oscillatory frequency caused by the spring 636 and the second spring (not visible). In some examples, system 620 may additionally or alternatively include one or more torsion springs situated co-axially with the pivot rod 632 and connected between the housing 660 and the mirror 630 to create a resonant oscillatory frequency.

An encoder disk 650 can be connected the back side of the body of the mirror 630 and situated to pass through a reader 652 to detect the orientation of the mirror 630. For example, the reader 652 can include a light source and detector that detects a pattern in the encoder disk 650 and associates the detected pattern with an orientation of the mirror 630. The reader 652 can be mounted to a control board 662 that is situated on the housing 662. The control board 662 may additionally or alternatively include driving circuitry for operating the conductive coil on the substrate 634.

In some embodiments, setting the mirror 630 to have a desired resonant oscillatory response offers a number of performance advantages over non-resonant systems. For example, tuning the system 620 to have a resonant oscillatory response (e.g., via the tension spring 636) allows the mirror 630 to be driven at higher frequencies, with wider scanning angles, and with less power than can be achieved with non-resonant systems. In particular, the resonant system 620 may be less susceptible than a non-resonant system to thermal limitations caused by heating of the conductive coil and other elements when driving non-resonant systems.

Figure 7:
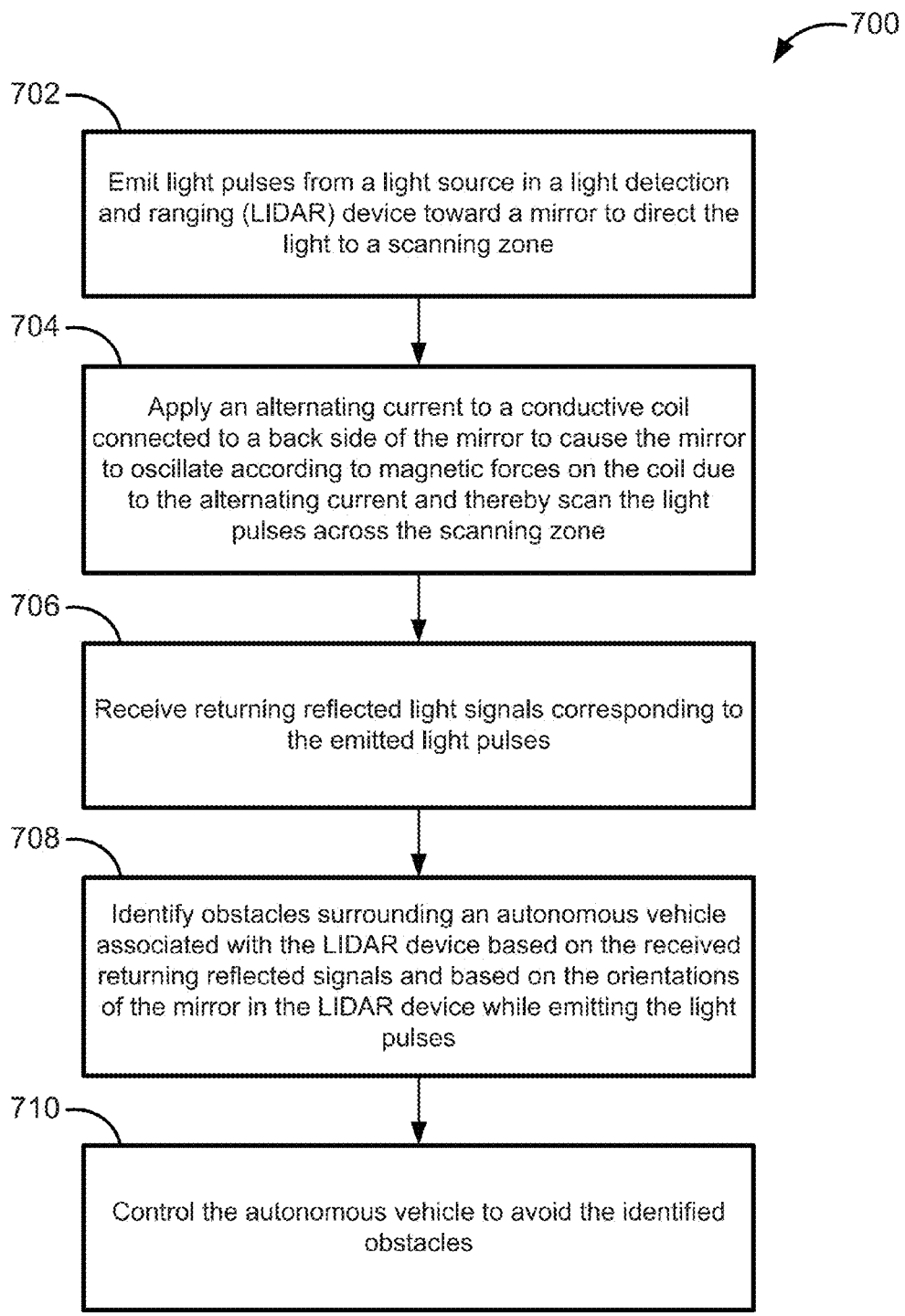
FIG. 7 is a flowchart of a process for operating a LIDAR system according to an example embodiment.

FIG. 7 is a flowchart of a process 700 for operating a LIDAR system according to an example embodiment. Pulses are emitted from a light source in a LIDAR device toward a reflective surface of a mirror to direct the light to a scanning zone (702). The mirror can include a conductive coil connected to the back side of the mirror. The conductive coil may be oriented in a plane perpendicular to an axis of rotation of the mirror. In some examples, the axis of rotation of the mirror may be situated between the reflective surface of the mirror and the conductive coil connected to the back side of the mirror. Moreover, an arrangement of magnets can be situated around the conductive coil to provide an associated magnetic field that is substantially perpendicular to the plane of the conductive coil (e.g., parallel to the axis of rotation of the mirror). In some examples, the magnetic field may have opposite directions (antiparallel directions) in the vicinity of the sides of the conductive coil with the most significant radial components, with respect to the axis of rotation of the mirror. An alternating current can be applied to the conductive coil connected to the back side of the mirror so as to cause the mirror to oscillate according to magnetic forces on the coil and thereby scan the light pulses across the scanning zone (704). The arrangement may be similar to the magnetically driven mirror 510 described above in connection with FIGS. 5 and 6, for example.

Returning reflected light signals corresponding to the emitted light pulses can be received (706). For example, returning reflected light signals may be received by the LIDAR device and/or an associated light sensor. The returning light signals can be used to identify obstacles surrounding an autonomous vehicle associated with the LIDAR device (708). The analysis of the returning light signals may include estimating a time delay between emission of a light pulse and reception of a corresponding reflected light signal and estimating an orientation of the mirror during the emission of the light pulse. The time delay and mirror orientation information may be used, for example, to generate a three-dimensional point map of reflective features surrounding the LIDAR device. For example, with reference to the vehicle 100 described in connection with FIG. 1, the LIDAR system may be used to generate a 3-D point map when is then used alone or in combination with other sensor systems to identify obstacles in the vicinity of the vehicle 100. The autonomous vehicle can then be operated to avoid the identified obstacles (710). For example, one or more of the sensor fusion algorithm 138, computer vision system 140, navigation/pathing system 142 and/or obstacle avoidance system 144 may be used to identify obstacles and then control the vehicle 100 to avoid the identified obstacles.

Furthermore, it is noted that the functionality described in connection with the flowchart described herein can be implemented as special-function and/or configured general-function hardware modules, portions of program code executed by a processor (e.g., the processor 113 in the computer system 112) for achieving specific logical functions, determinations, and/or steps described in connection with the flowcharts. Where used, program code can be stored on any type of computer readable medium (e.g., computer readable storage medium or non-transitory media, such as data storage 114 described above with respect to computer system 112), for example, such as a storage device including a disk or hard drive. In addition, each block of the flowcharts can represent circuitry that is wired to perform the specific logical functions in the process. Unless specifically indicated, functions in the flowcharts can be executed out of order from that shown or discussed, including substantially concurrent execution of separately described functions, or even in reverse order in some examples, depending on the functionality involved, so long as the overall functionality of the described method is maintained. Furthermore, similar combinations of hardware and/or software elements can be employed to implement the methods described in connection with other flowcharts provided in the present disclosure.

As used herein a "scanning zone" generally refers to a region of a scanned environment scanned by a single LIDAR device, or a combination of LIDAR devices, that is completely sampled in a complete scan by the LIDAR device. That is, for a LIDAR device operated to continuously actively map its surroundings for reflective features, the scanning zone is the complete region mapped before returning to map the same point again. Generally, the scanning zone referred to herein is defined with reference to the point of view of the LIDAR device in terms of azimuth (e.g., angle along the horizon) and altitude (e.g., angle perpendicular to the horizon) with respect to the point of view of the LIDAR device. Thus, the geographic location mapped by the scanning zone of a LIDAR device is not fixed, but rather moves with the LIDAR device. For example, the scanning zone can be considered a bubble (or cone-shaped region, etc.) surrounding a particular LIDAR device with dimensions defined by the maximum distance sensitivity of the LIDAR device.

Figure 8:
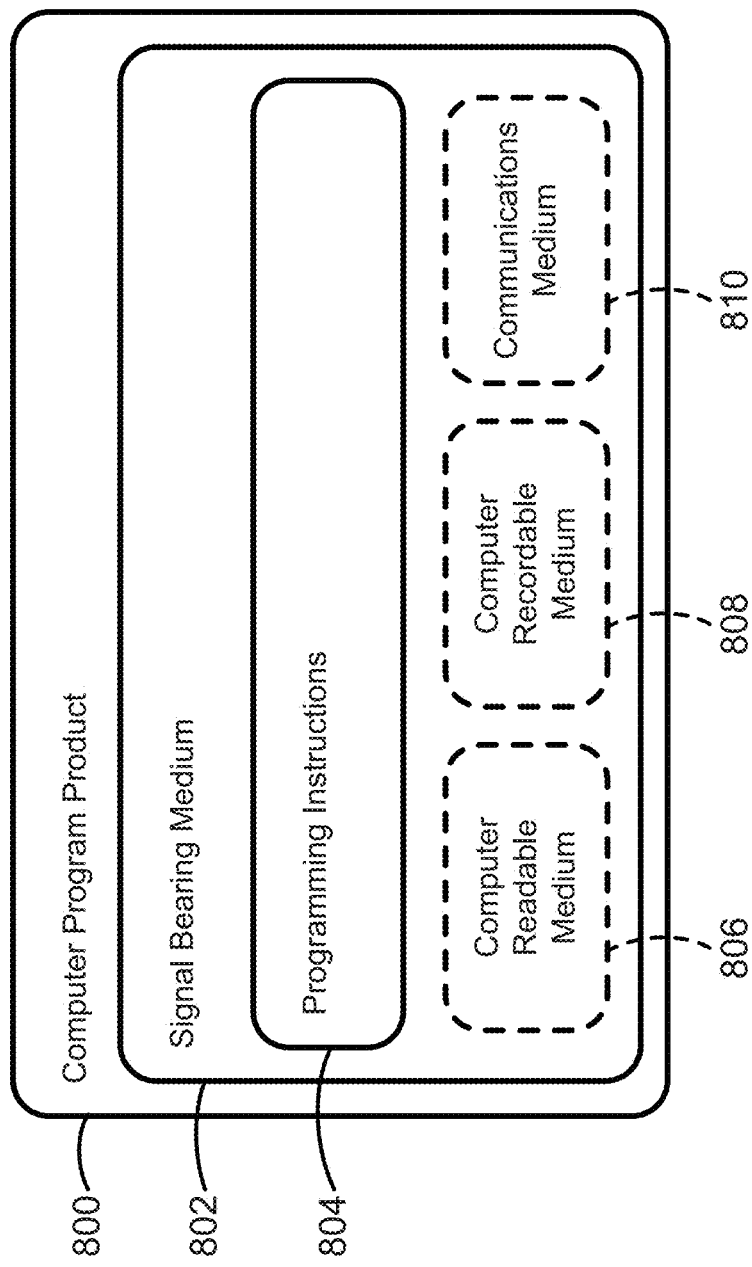
FIG. 8 depicts a non-transitory computer-readable medium configured according to an example embodiment.

FIG. 8 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above, such as the processes discussed in connection with FIG. 7 above.

As noted above, in some embodiments, the disclosed techniques can be implemented by computer program instructions encoded on a non-transitory computer-readable storage media in a machine-readable format, or on other non-transitory media or articles of manufacture (e.g., the instructions 115 stored on the data storage 114 of the computer system 112 of vehicle 100 and/or instructions executed by the controller 316 of the LIDAR system 300). FIG. 8 is a schematic illustrating a conceptual partial view of an example computer program product 800 that includes a computer program for executing a computer process on a computing device, arranged according to at least some embodiments presented herein.

In one embodiment, the example computer program product 800 is provided using a signal bearing medium 802. The signal bearing medium 802 may include one or more programming instructions 804 that, when executed by one or more processors may provide functionality or portions of the functionality described above with respect to FIGS. 1-7. In some examples, the signal bearing medium 802 can be a non-transitory computer-readable medium 806, such as, but not limited to, a hard disk drive, a Compact Disc (CD), a Digital Video Disk (DVD), a digital tape, memory, etc. In some implementations, the signal bearing medium 802 can be a computer recordable medium 808, such as, but not limited to, memory, read/write (RAY) CDs, R/W DVDs, etc. In some implementations, the signal bearing medium 802 can be a communications medium 810, such as, but not limited to, a digital and/or an analog communication medium (e.g., a fiber optic cable, a waveguide, a wired communications link, a wireless communication link, etc.). Thus, for example, the signal bearing medium 802 can be conveyed by a wireless form of the communications medium 810.

The one or more programming instructions 804 can be, for example, computer executable and/or logic implemented instructions. In some examples, a computing device such as the computer system 112 of FIG. 1 is configured to provide various operations, functions, or actions in response to the programming instructions 804 conveyed to the computer system 112 by one or more of the computer readable medium 806, the computer recordable medium 808, and/or the communications medium 810.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A light detection and ranging (LIDAR) device comprising:
   a rotating mirror system including:
      a mirror body with a reflective side and a back side opposite the reflective side, wherein the mirror body is arranged to rotate about an axis of rotation substantially parallel to the reflective side such that a change in angle of rotation creates a corresponding change in orientation of a normal direction of the reflective side;
      a conductive coil coupled to the mirror body, wherein the conductive coil is oriented in a plane substantially perpendicular to the axis of rotation, and wherein the conductive coil is arranged such that the axis of rotation is between the reflective side and the conductive coil;
      a driving circuit configured to apply a current through the conductive coil; and
      at least one magnet with an associated magnetic field arranged such that current flowing through the conductive coil urges the conductive coil in a direction perpendicular to both the magnetic field and the direction of current flow so as to generate a torque on the mirror body; and
   a light source configured to emit light pulses directed toward the rotating mirror system such that the light pulses are reflected by the reflective side and emitted from the LIDAR device according to the orientation of the reflective side.

2. The LIDAR device according to claim 1, wherein the driving circuit is further configured to periodically alternate the direction of current in the conductive coil to cause the mirror to oscillate.

3. The LIDAR device according to claim 2, wherein periodically alternating current in the conductive coil generates corresponding periodic oscillations in the orientation of the rotating mirror system in which the reflective side of the mirror body oscillates through a range of orientations to cause the light pulses to scan a scanning zone.

4. The LIDAR device according to claim 1, wherein the conductive coil is arranged in a loop with four sides, and the four sides include:
   a first radial side arranged approximately along a line intersecting the axis of rotation of the rotating mirror;
   a second radial side arranged approximately along a line intersecting the axis of rotation of the rotating mirror;
   an inner side connecting ends of the first and second radial sides proximate the axis of rotation of the rotating mirror; and
   an outer side connecting ends of the first and second radial sides distal the axis of rotation of the rotating mirror;
   wherein the two radial sides contribute torque forces on the mirror body while current is flowing through the conductive coil such that a net torque on the mirror body depends on the interaction between the current flowing through the first and second radial sides of the conductive coil and the magnetic field associated with the at least one magnet in the vicinity of the first and second radial sides.

5. The LIDAR device according to claim 4, wherein the at least one magnet includes a first permanent magnet and second permanent magnet arranged: (i) with the first permanent magnet situated to provide a magnetic field in the vicinity of the first radial side of the conductive coil with a first direction oriented parallel to the axis of rotation of the rotating mirror; and (ii) with the second permanent magnet situated to provide a magnetic field in the vicinity of the second radial side of the conductive coil with a second direction oriented antiparallel to the first direction.

6. The LIDAR device according to claim 1, further comprising a ferromagnetic yoke for substantially containing the magnetic field associated with the at least one magnet to a region through which the conductive coil passes during rotation of the rotating mirror;
   wherein the at least one magnet includes a first permanent magnet and second permanent magnet, and wherein the first and second permanent magnets and the ferromagnetic yoke are arranged such that the magnetic field surrounding the conductive coil includes: (i) a first region having a local magnetic field oriented in a first direction parallel to the axis of rotation of the rotating mirror, and (ii) a second region having a local magnetic field oriented in a second direction antiparallel to the first direction.

7. The LIDAR device according to claim 1, wherein the conductive coil is embedded in a printed circuit board attached to the back side of the mirror body.

8. The LIDAR device according to claim 1, further comprising:
   an optical encoder arranged to detect an orientation angle of the rotating mirror system.

9. The LIDAR device according to claim 1, further comprising:
   a pivot rod forming the axis of rotation of the rotating mirror system, wherein the pivot rod passes through the mirror body;
   a housing to which is mounted the at least one magnet and the pivot rod such that the mirror body rotates with respect to the housing; and
   one or more springs connected between housing and points on the mirror body distal from the axis of rotation, wherein the one or more springs cause the rotating mirror system to have a resonant oscillatory response.

10. The LIDAR device according to claim 1, further comprising a light sensor configured to detect returning reflected light signals corresponding to the emitting light pulses, and wherein the LIDAR device is associated with an autonomous vehicle that is configured to use the received returning reflected signals to detect obstacles and then control the vehicle to avoid the detected obstacles.

11. An autonomous vehicle system comprising:
   a light detection and ranging (LIDAR) device including:
      a rotating mirror system including:
         a mirror body with a reflective side and a back side opposite the reflective side, wherein the mirror body is arranged to rotate about an axis of rotation substantially parallel to the reflective side such that a change in angle of rotation creates a corresponding change in orientation of a normal direction of the reflective side;
         a conductive coil coupled to the mirror body, wherein the conductive coil is oriented in a plane substantially perpendicular to the axis of rotation, and wherein the conductive coil is arranged such that the axis of rotation is between the reflective side and the conductive coil;
         a driving circuit configured to create a current through the conductive coil; and
         at least one magnet with an associated magnetic field arranged such that current flowing through the conductive coil urges the conductive coil in a direction perpendicular to both the magnetic field and the direction of current flow so as to generate a torque on the mirror body;

a light source configured to emit light pulses directed toward the rotating mirror system such that the light pulses are reflected by the reflective side and emitted from the LIDAR device according to the orientation of the reflective side; and a sensor configured to receive returning reflected signals corresponding to the light pulses emitted from the LIDAR device; and a controller configured to:
instruct the LIDAR device to scan a scanning zone while emitting light pulses;
identify obstacles surrounding the autonomous vehicle based on returning reflected light signals corresponding to the emitted light pulses; and
control the autonomous vehicle to avoid the identified obstacles.

12. The autonomous vehicle system according to claim 11, wherein the driving circuit is further configured to periodically alternate the direction of current through the conductive coil.

13. The autonomous vehicle system according to claim 12, wherein periodically alternating current through the conductive coil generates corresponding periodic oscillations in the orientation of the rotating mirror system in which the reflective side of the mirror body oscillates through a range of orientations to cause the light pulses to scan a scanning zone.

14. The autonomous vehicle system according to claim 11, wherein the conductive coil is embedded in a printed circuit board attached to the back side of the mirror body.

15. The autonomous vehicle system according to claim 11, wherein the LIDAR device further includes:
an optical encoder arranged to detect an orientation angle of the rotating mirror system, and
wherein the controller is further configured to receive an indication of an orientation angle of the rotating mirror system detected by the optical encoder.

16. The autonomous vehicle system according to claim 11, wherein the LIDAR device further includes:
a pivot rod defining the axis of rotation of the rotating mirror system, wherein the pivot rod passes through the mirror body; and
a housing to which is mounted the at least one magnet and the pivot rod such that the mirror body rotates with respect to the housing.

17. The autonomous vehicle system according to claim 16, wherein the rotating mirror system further includes an optical encoder disk mounted to rotate with the mirror body and a light sensor fixed with respect to the at least one magnet and configured to detect movement of the encoder disk.

18. A method comprising:
emitting light pulses from a light source in a light detection and ranging (LIDAR) device toward a reflective side of a mirror;
while emitting the series of light pulses, applying an alternating current to a conductive coil coupled to the mirror, wherein the conductive coil is oriented in a plane substantially perpendicular to an axis of rotation of the mirror, wherein the axis of rotation of the mirror is oriented substantially parallel to the reflective side of the mirror and situated between the reflective side of the mirror and the conductive coil, and wherein at least one magnet is arranged such that current flowing through the conductive coil urges the conductive coil in a direction perpendicular to both the magnetic field and the direction of current flow so as to generate a torque on the mirror about the axis of rotation such that the applied alternating current causes the mirror to oscillate;
receiving returning reflected signals corresponding to the emitted light pulses;
identifying obstacles surrounding an autonomous vehicle associated with the LIDAR device based on the received returning reflected signals and based on the orientations of the mirror in the LIDAR device while emitting the light pulses; and
controlling the autonomous vehicle to avoid the identified obstacles.

19. The method according to claim 18, further comprising:
receiving orientation feedback information from an optical encoder situated to detect the orientation angle of the mirror; and
wherein the identifying the obstacles is also based on the received orientation feedback information.

20. The method according to claim 18, wherein the applied alternating current has a frequency of at least 60 hertz.

* * * * *